(12) United States Patent
Kim et al.

(10) Patent No.: US 10,843,629 B2
(45) Date of Patent: Nov. 24, 2020

(54) SIDE MIRROR FOR A VEHICLE

(71) Applicant: LG Electronics Inc., Seoul (KR)

(72) Inventors: Daebum Kim, Seoul (KR); Sangyol Yoon, Seoul (KR); Kihoon Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/855,701

(22) Filed: Dec. 27, 2017

(65) Prior Publication Data

US 2019/0031105 A1    Jan. 31, 2019

(30) Foreign Application Priority Data

Jul. 26, 2017  (KR) ........................ 10-2017-0094935

(51) Int. Cl.

| | | |
|---|---|---|
| B60R 1/12 | (2006.01) | |
| B60R 1/06 | (2006.01) | |
| B60R 1/072 | (2006.01) | |
| B60R 1/074 | (2006.01) | |
| B60R 1/08 | (2006.01) | |
| G06K 9/00 | (2006.01) | |

(52) U.S. Cl.
CPC .................. B60R 1/12 (2013.01); B60R 1/06 (2013.01); B60R 1/072 (2013.01); B60R 1/074 (2013.01);
(Continued)

(58) Field of Classification Search
CPC .. B60R 1/12; B60R 1/06; B60R 1/088; B60R 1/074; B60R 1/072; B60R 1/081;
(Continued)

(56) References Cited

U.S. PATENT DOCUMENTS 5,289,321 A *  2/1994  Secor ..................... B60K 35/00
                                                  348/118
2006/0098289 A1*  5/2006  McCabe ................... B60R 1/12
                                                  359/603
(Continued)

FOREIGN PATENT DOCUMENTS

| JP | 2016220011 | 12/2016 |
|---|---|---|
| JP | 2017065388 | 4/2017 |

(Continued)

OTHER PUBLICATIONS

PCT International Search Report in International Appln. No. PCT/KR2018/008404, dated Nov. 23, 2018, 3 pages.

*Primary Examiner* — Nasim N Nirjhar
(74) *Attorney, Agent, or Firm* — Fish & Richardson P.C.

(57) ABSTRACT

A side mirror for a vehicle includes a camera, a mirror panel disposed at a portion of the side mirror, a display panel stacked on the mirror panel, and at least one processor configured to cause the side mirror to enter one of a mirror mode or a display mode based on vehicle traveling information, based on the side mirror being in the mirror mode, to output, on a portion of the display panel, a visualization on a mirror image that appears in the mirror panel, based on the side mirror being in the display mode, to output, on the display panel in the display mode, a side-rear image captured by the camera, and based on the side mirror being in the display mode, to provide, a visual effect to a portion of the side-rear image regarding ambient situation information.

15 Claims, 24 Drawing Sheets

(52) U.S. Cl.
CPC .............. *B60R 1/081* (2013.01); *B60R 1/088* (2013.01); *G06K 9/00805* (2013.01); *B60R 2001/1253* (2013.01); *B60R 2300/207* (2013.01); *B60R 2300/307* (2013.01); *B60R 2300/806* (2013.01); *B60R 2300/8026* (2013.01); *B60R 2300/8046* (2013.01); *B60R 2300/8066* (2013.01); *B60R 2300/8093* (2013.01)

(58) Field of Classification Search
CPC ........ B60R 2300/806; B60R 2300/307; B60R 2300/8066; B60R 2300/8046; B60R 2300/8026; B60R 2300/207; B60R 2300/8093; B60R 2001/1253; G06K 9/00805

See application file for complete search history.

(56) References Cited

U.S. PATENT DOCUMENTS

| | | | |
|---|---|---|---|
| 2008/0106389 A1* | 5/2008 | Desai | B60O 1/2665 340/425.5 |
| 2009/0284598 A1* | 11/2009 | Busch | B60R 1/00 348/148 |
| 2010/0194596 A1 | 8/2010 | Wang et al. | |
| 2010/0201816 A1 | 8/2010 | Lee et al. | |
| 2010/0283633 A1* | 11/2010 | Becker | B60R 1/00 340/932.2 |
| 2013/0018545 A1* | 1/2013 | Prakah-Asante | G08G 1/166 701/36 |
| 2016/0084661 A1* | 3/2016 | Gautama | G01C 21/365 701/400 |
| 2016/0121795 A1* | 5/2016 | Smith | B60R 1/025 359/843 |
| 2016/0301854 A1* | 10/2016 | Kato | H04N 5/23212 |
| 2017/0237946 A1* | 8/2017 | Schofield | B60C 23/00 348/148 |
| 2019/0018408 A1* | 1/2019 | Gulati | G05D 1/0055 |

FOREIGN PATENT DOCUMENTS

| | | |
|---|---|---|
| KR | 1020110087085 | 8/2011 |
| KR | 101480914 | 1/2015 |
| KR | 1020150130723 | 11/2015 |
| KR | 1020160144829 | 12/2016 |

* cited by examiner (a)

(b)

(a)

(b)

(a)

(b)

(a)

(b)

SIDE MIRROR FOR A VEHICLE

CROSS-REFERENCE TO RELATED APPLICATION

This application claims the priority benefit of Korean Patent Application No. 10-2017-0094935, filed on Jul. 26, 2017, in the Korean Intellectual Property Office, the disclosure of which is incorporated herein by reference.

FIELD

The present disclosure relates to a side mirror for a vehicle, and more particularly to a side mirror that can output a side-rear image of a vehicle on a display panel and that can reflect a side rear area of the vehicle in a mirror panel.

BACKGROUND

A vehicle is an apparatus that can transport a passenger in a direction intended by the passenger. A car is an example vehicle.

In order to improve the convenience of vehicle users, a vehicle may be equipped with various sensors and electronic devices. For example, an Advanced Driver Assistance System (ADAS) is under active study with a goal to increase the driving convenience of users. In addition, efforts are being actively made to develop autonomous vehicles.

A vehicle may be equipped with side mirrors including mirrors in which a side rear area of the vehicle may be reflected so that a driver can monitor the side rear area of the vehicle.

The side mirrors for a vehicle may include display devices instead of mirrors. The side mirrors including display devices may output a side-rear image of the vehicle captured by cameras.

A mirror-display device is a mirror capable of outputting an image. The mirror-display device may operate as a mirror in an OFF state and may display an image on a portion thereof in an ON state.

A vehicle may be further equipped with a device for folding or unfolding side mirrors.

Recently, research has been conducted with the aim of developing side mirrors that may be folded or unfolded and may selectively perform a mirror mode or a display mode based on traveling conditions while a vehicle is traveling.

SUMMARY

One object of the present disclosure may be to provide a side mirror, in which a mirror mode or a display mode is selectively performed based on traveling conditions of the vehicle.

Another object of the present disclosure may be to provide a side mirror, in which a folding mode or an unfolding mode is selectively performed based on the traveling conditions of the vehicle.

Another object of the present disclosure may be to provide a side mirror, in which a variable image is output on a mirror or a visual effect is provided to a side-rear image of a vehicle based on the traveling conditions of the vehicle.

The objects to be accomplished by the disclosure are not limited to the above-mentioned objects, and other objects not mentioned will be clearly understood by those skilled in the art from the following description.

According to one aspect of the subject matter described in this application, a side mirror for a vehicle includes a camera, a mirror panel disposed at a portion of the side mirror, a display panel stacked on the mirror panel, and at least one processor. The at least one processor is configured to: cause the side mirror to enter one of a mirror mode or a display mode based on vehicle traveling information; based on the side mirror being in the mirror mode, output, on a portion of the display panel, a visualization on a mirror image that appears in the mirror panel; based on the side mirror being in the display mode, output, on the display panel in the display mode, a side-rear image captured by the camera; and based on the side mirror being in the display mode, provide, a visual effect to a portion of the side-rear image regarding ambient situation information.

Implementations according to this aspect may include one or more of the following features. For example, the at least one processor may be further configured to determine whether the camera is able to capture an adequate image based on the vehicle traveling information, and cause the side mirror to enter the mirror mode based on a determination that the camera is not able to capture the adequate image. The at least one processor may be further configured to determine whether the camera is not able to capture the adequate image based on determining whether the camera is faulty or the side-rear image includes an error. For example, determining whether the camera is faulty may be based on vehicle state information, and determining whether the side-rear image includes an error may be based on the ambient state information.

The mirror panel and the display panel may include bendable panels, and the side mirror may further include a bending device configured to bend the mirror panel and the display panel. In this case, based on the side mirror being in the mirror mode, the at least one processor may be further configured to determine whether a second vehicle is present in a blind spot detection (BSD) area of the vehicle based on the ambient situation information, and control the bending device to bend the mirror panel and the display panel to thereby include the BSD area in the mirror image.

In some implementations, the at least one processor may be further configured to cause the side mirror to enter the display mode based on a determination that the side mirror is in a folded state or that a number of other vehicles located in the BSD area is greater than or equal to a predetermined value.

In some examples, the at least one processor may be further configured to cause the side mirror to enter one of the mirror mode or the display mode based on a user input. The at least one processor may be further configured to determine whether a first event occurs based on the vehicle traveling information; and output, on a portion of the display panel, an image captured by the camera based on a determination of occurrence of the first event. The at least one processor may be further configured to determine the occurrence of the first event by determining whether an object is located in a side rear area of the vehicle based on the ambient situation information, acquire an image of the object through the camera based on a determination that the object is located in the side rear area of the vehicle, and output the image of the object on a portion of the display panel.

In some examples, the at least one processor may be further configured to: identify a secondary area in the mirror image, output, based on the side mirror being in the mirror mode, the image of the object to the secondary area in the mirror image; and output, based on the side mirror being in the display mode, the image of the object to the secondary area in the side-rear image. The at least one processor may be further configured to: determine whether a size of the object displayed in one of the mirror image or the side-rear image is less than or equal to a predetermined size; and output an enlarged image of the object on a portion of the display panel based on a determination that the size of the object displayed in one of the mirror image or the side-rear image is less than or equal to the predetermined size.

In some implementation, the side mirror may further include a folding device configured to fold and unfold the side mirror, and the at least one processor may be further configured to control the folding device to fold or unfold the side mirror based on the vehicle traveling information.

In some examples, the at least one processor may be further configured to determine whether an air drag attribute of the side mirror should be reduced based on the vehicle traveling information, and control the folding device to fold the side mirror based on a determination that the air drag attribute of the side mirror needs to be reduced. The at least one processor may be further configured to determine whether the camera is not able to capture an image based on the vehicle traveling information; control the folding device to unfold the side mirror based on determination that the camera is not able to capture an image; and cause the side mirror to enter the mirror mode based on a determination that the camera is not able to capture an image.

In some implementations, the at least one processor may be further configured to output, based on the vehicle being parked in a state in which the side mirror is folded, the side-rear image in an augmented reality manner to indicate at least one of an available space, a set guidance path, a predicted path determined based on a steering angle of a steering wheel of the vehicle, or a predicted collision point determined based on the predicted path. The at least one processor may be further configured to, based on the vehicle being parked in a state in which the side mirror is unfolded, identify a parking space around the vehicle based on the side-rear image captured by the camera.

In some implementations, the at least one processor may be further configured to: output, based on a potentially dangerous object appearing in the mirror image in the mirror mode, the visualization to highlight the potentially dangerous object on a portion of the display panel; and provide, based on a potentially dangerous object appearing in the side-rear image captured by the camera in the display mode, the visual effect to highlight the potentially dangerous object in the side-rear image. The at least one processor may be further configured to change one of the visualization or the visual effect based on information about the potentially dangerous object.

In some examples, the at least one processor may be further configured to: based on the side mirror being in the mirror mode, output, on a portion of the display panel, the visualization to blur or darken a secondary area in the mirror image; and based on the side mirror being in the display mode, provide the visual effect to blur or darken a secondary area in the side-rear image captured by camera.

In some implementations, the at least one processor may be further configured to: based on the side mirror being in the mirror mode, output, on a portion of the display panel, the visualization to darken a glare area in the mirror image; and based on the side mirror being in the display mode, provide the visual effect to darken a glare area in the side-rear image captured by the camera.

The objectives and other advantages of the disclosure may be realized and attained by the structure particularly pointed out in the written description and claims hereof as well as the appended drawings.

DETAILED DESCRIPTION

Figure 1:
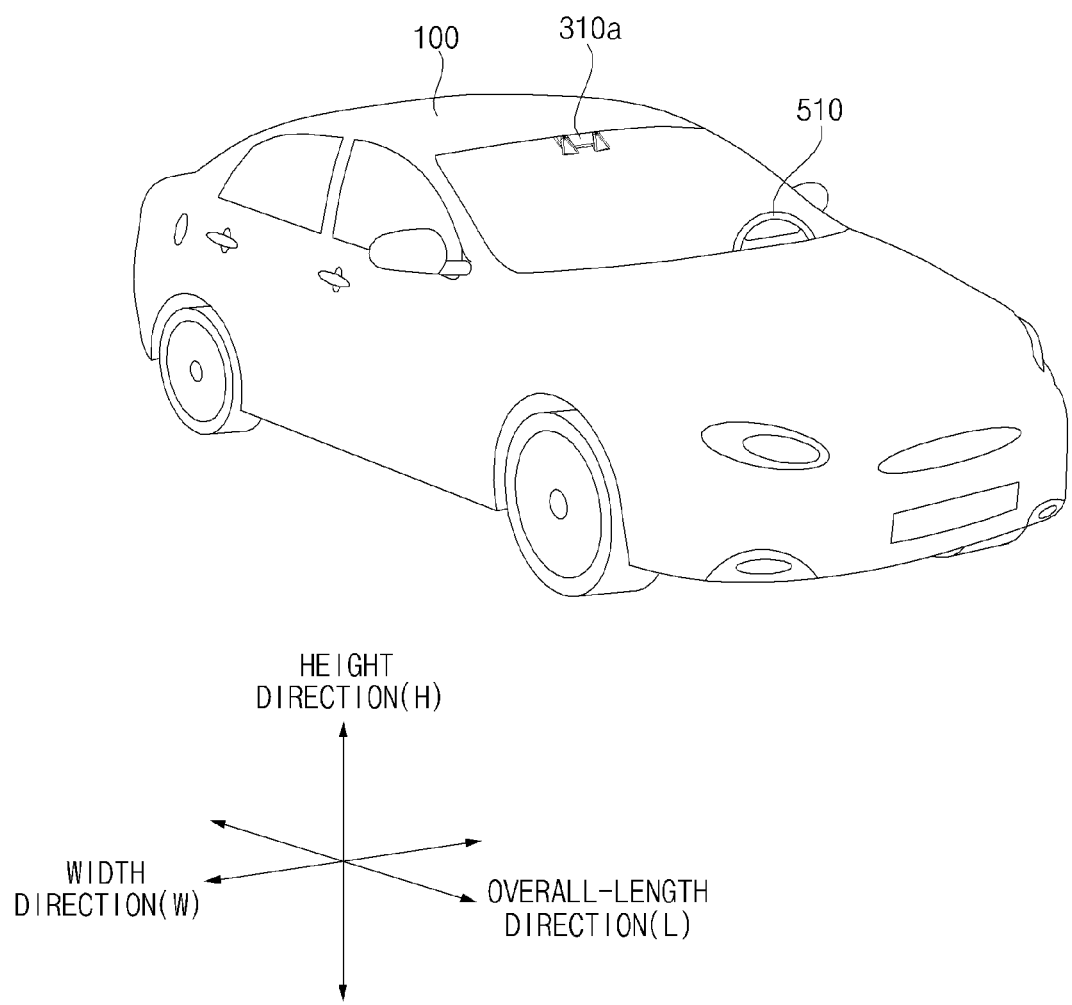
FIG. 1 is a view illustrating an example external appearance of an example vehicle.

Example implementations of the present disclosure will be described in detail with reference to the attached drawings. Like reference numerals denote the same or similar components throughout the drawings and a redundant description of the same components will be avoided.

The term "vehicle" as used in the present disclosure may refer to a car, a motorbike, or other types of vehicles. The following description is given with the appreciation that a vehicle is a car, by way of example.

In the following description, a vehicle may include any of an internal combustion vehicle equipped with an engine as a power source, a hybrid vehicle equipped with an engine and an electrical motor as power sources, an electric vehicle equipped with an electrical motor as a power source, and the like.

In the following description, the left of a vehicle refers to the left of the driving direction of the vehicle, and the right of the vehicle refers to the right of the driving direction of the vehicle.

FIGS. 1 to 7 illustrate an example vehicle. The vehicle will be described below with reference to FIGS. 1 to 7.

FIG. 1 illustrates an example external appearance of the vehicle.

Figure 2:
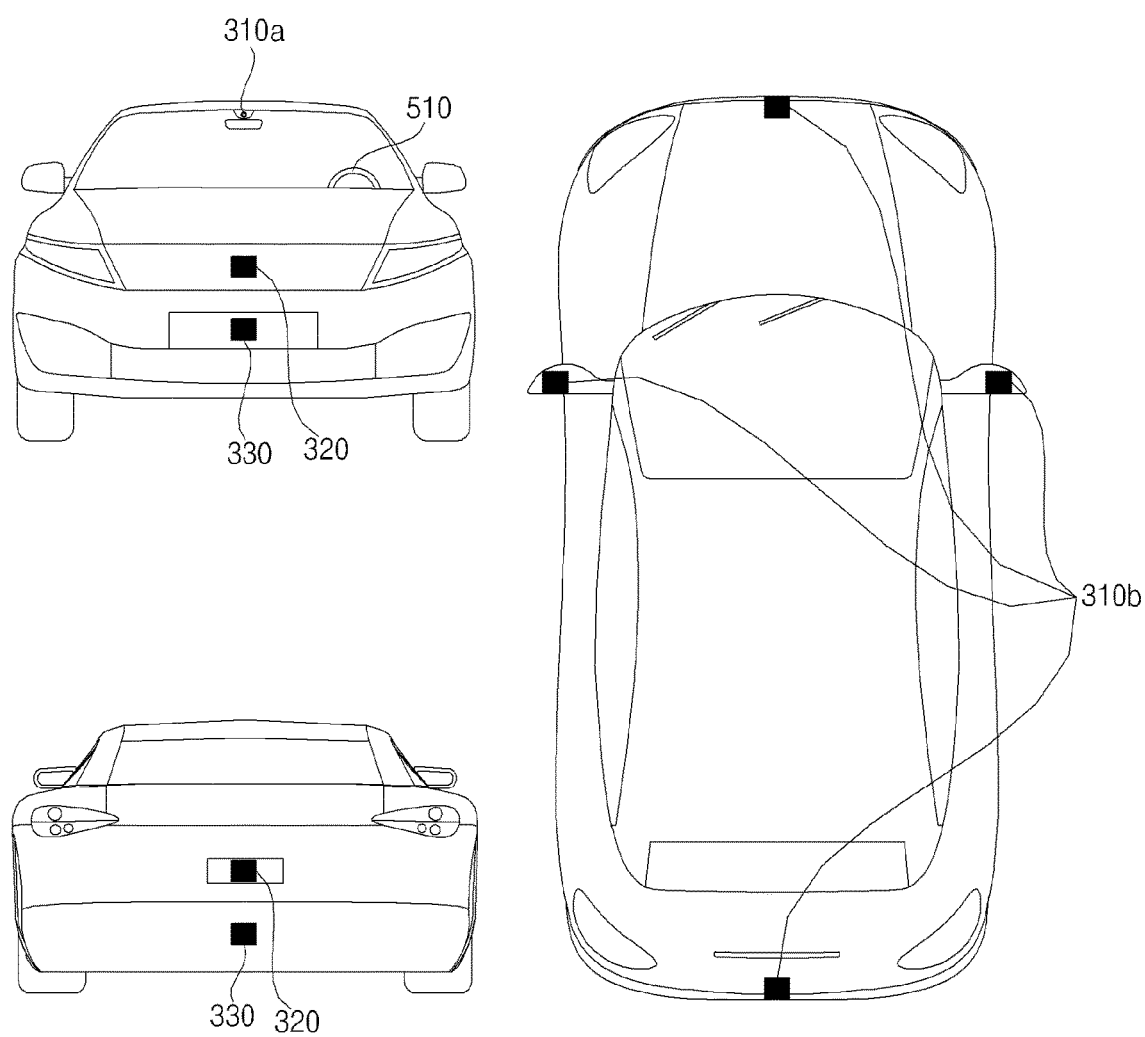
FIG. 2 is a view illustrating the external appearance of the vehicle seen at various angles from the outside of the vehicle.

FIG. 2 illustrates example external appearances of the vehicle seen at various angles from the outside of the vehicle.

Figure 3:
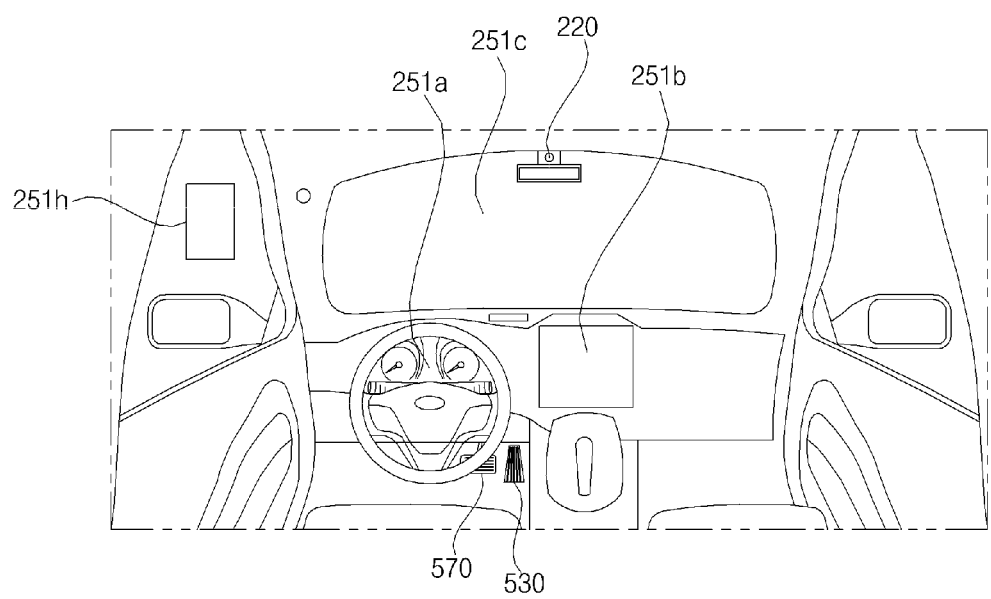
FIGS. 3 and 4 are views illustrating an example interior of the vehicle.
Figure 4:
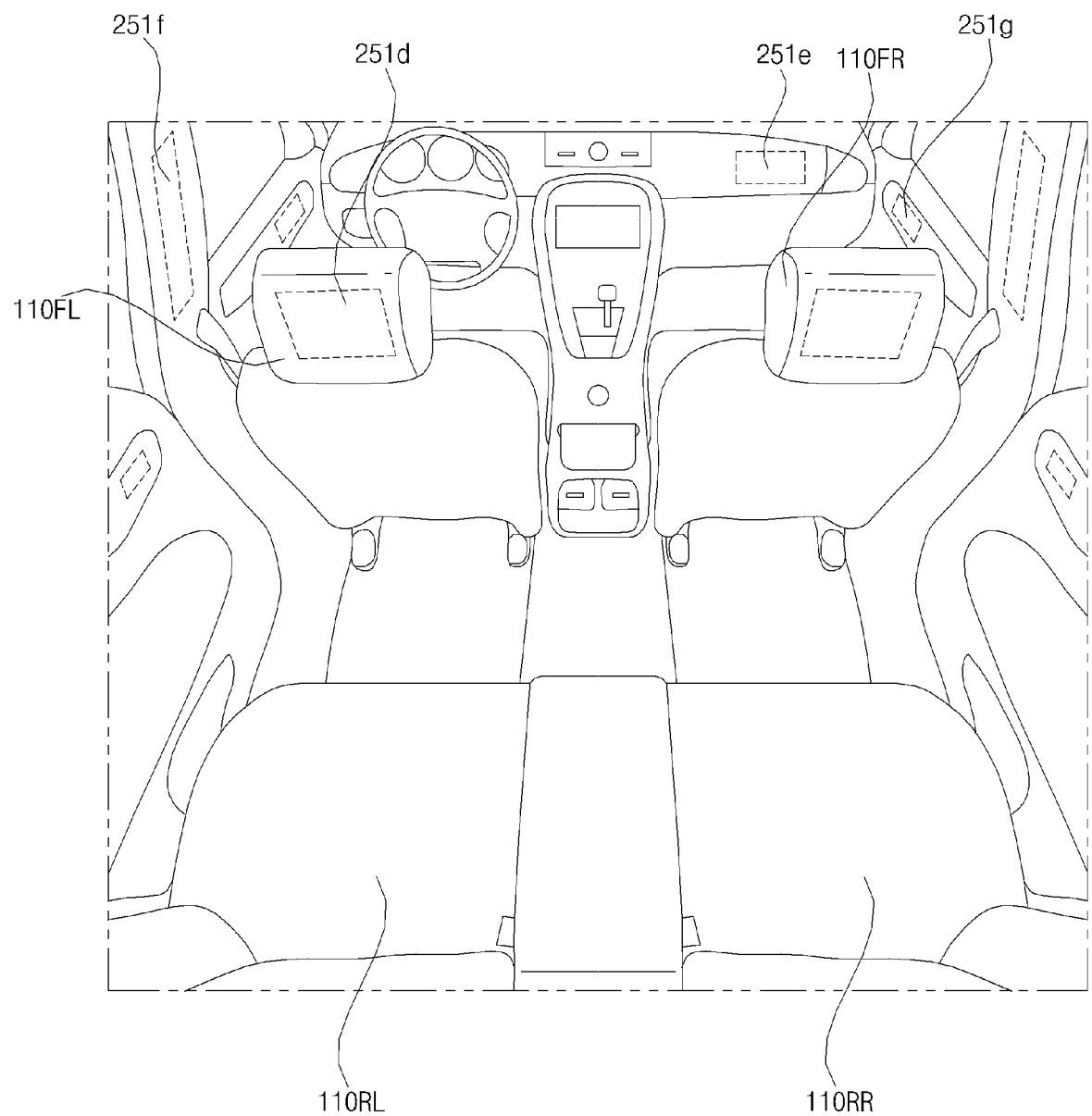

FIGS. 3 and 4 illustrate an example interior of the vehicle.

Figure 5:
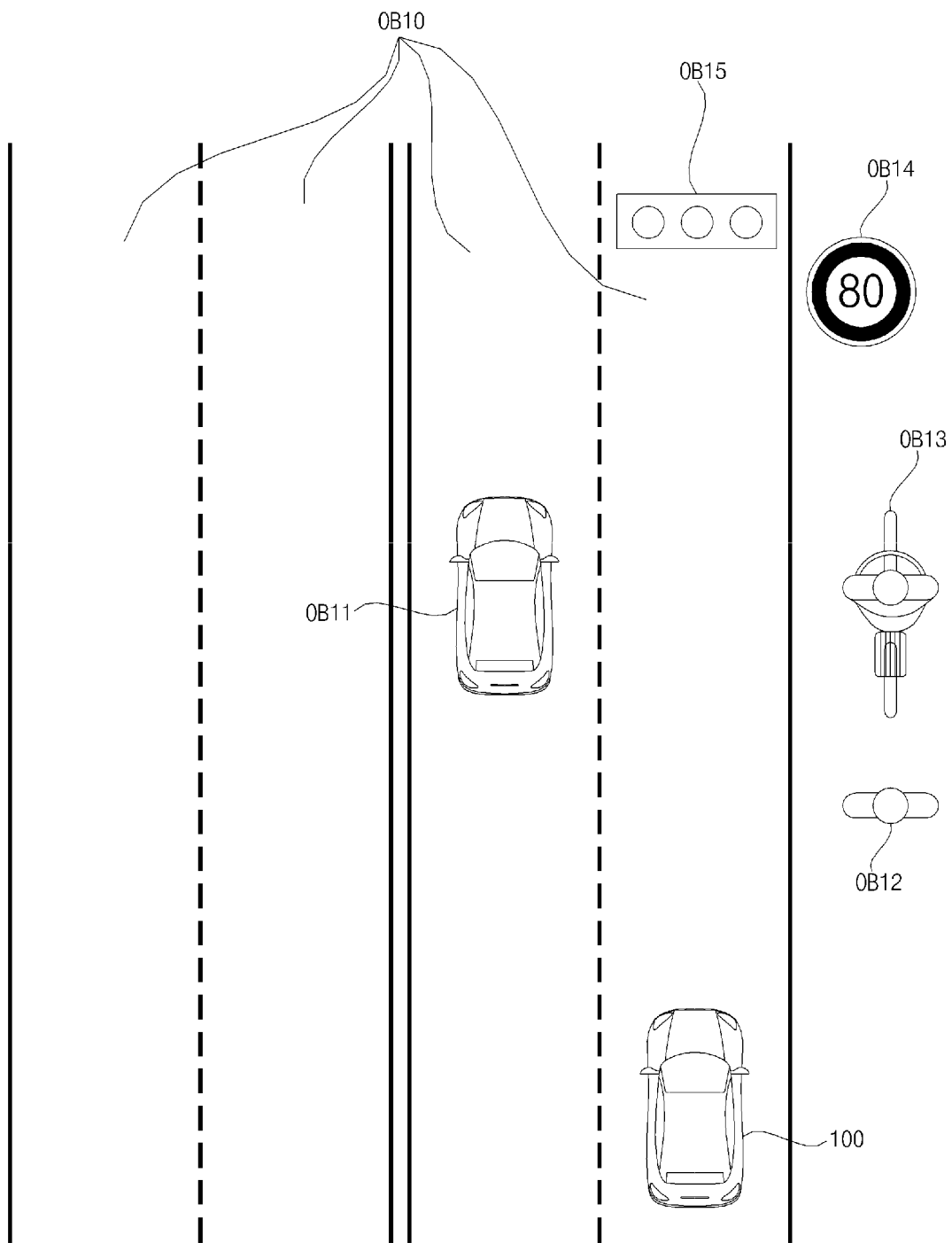
FIGS. 5 and 6 are views showing example objects around the vehicle.
Figure 6:
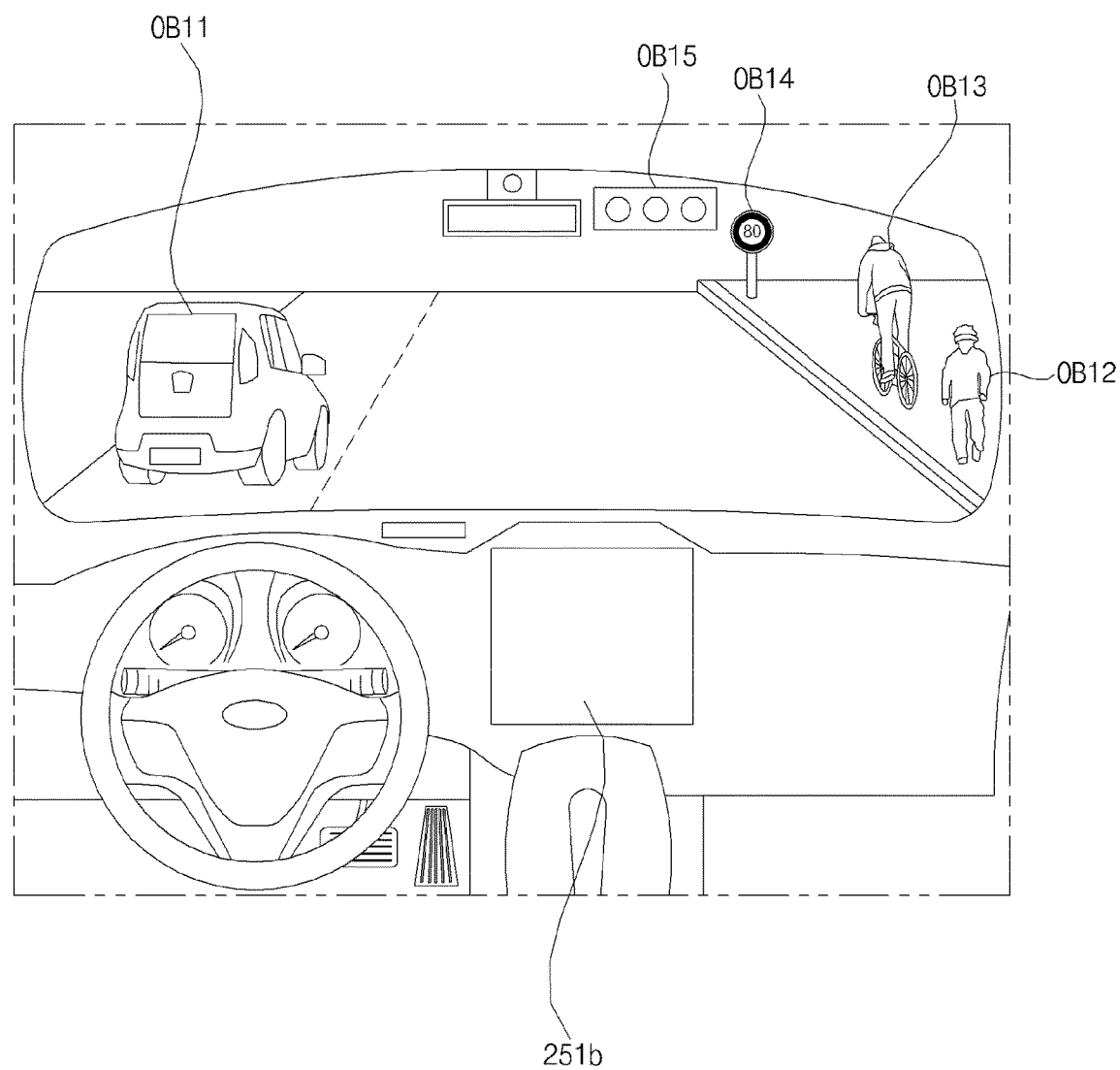

FIGS. 5 and 6 illustrate example objects.

Figure 7:
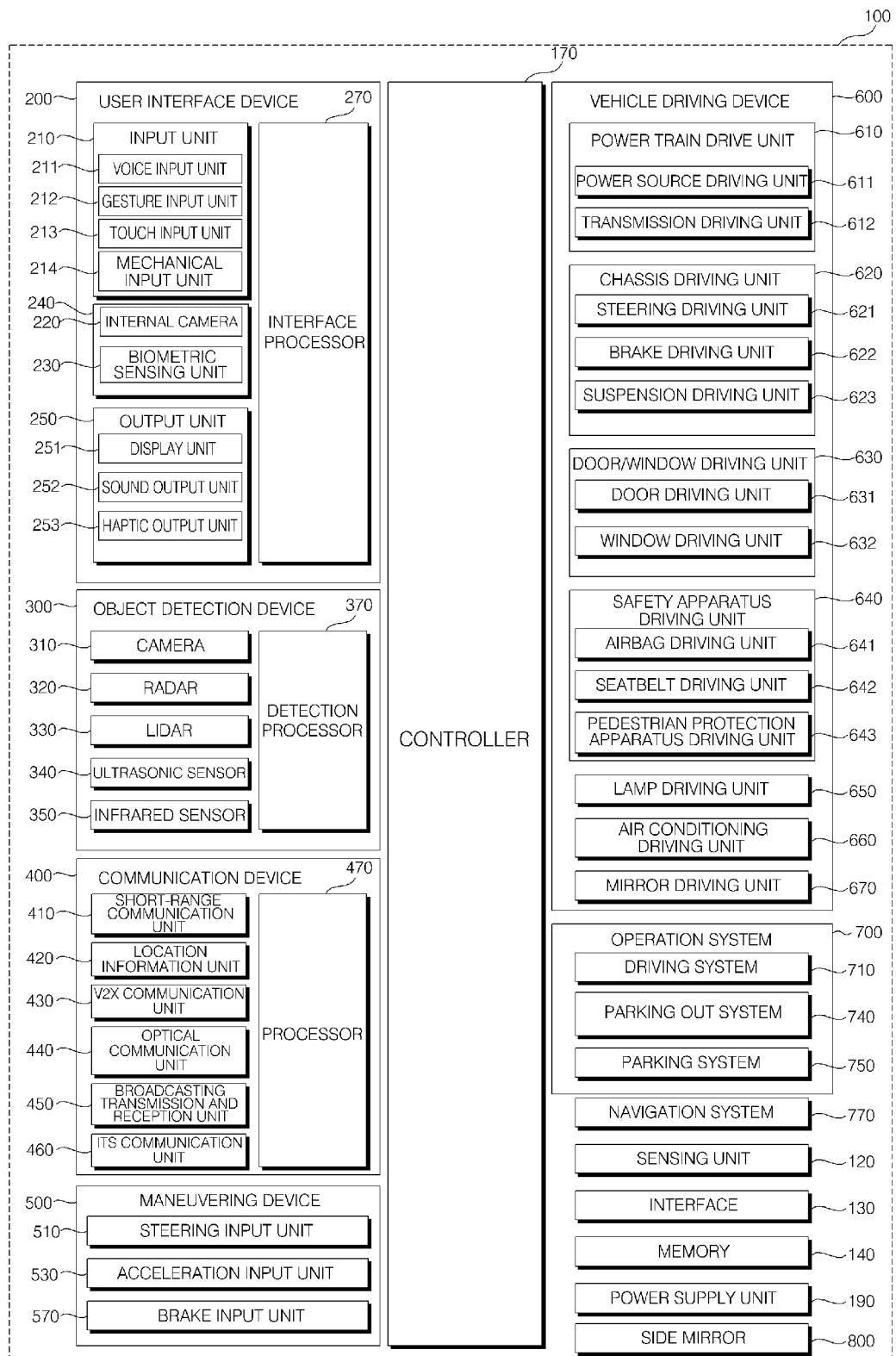
FIG. 7 is a block diagram showing example components of the vehicle.

FIG. 7 is a block diagram of example components of the vehicle.

Referring to FIGS. 1 to 7, a vehicle 100 may include wheels configured to be rotated by a power source, and a steering input device 510 for controlling the driving direction of the vehicle 100.

The vehicle 100 may include various driver assistance devices. For example, a driver assistance device is a device that assists a driver based on information acquired through various sensors. Such a driver assistance device may be referred to as an Advanced Driver Assistance System (ADAS).

The vehicle 100 may include various vehicle illumination devices. The vehicle illumination devices may include a head lamp, a rear combination lamp, a turn signal lamp, a room lamp, and so on. The rear combination lamp may include a brake lamp and a tail lamp.

The vehicle 100 may include an internal sensing device and an external sensing device.

An overall length is a length from the front end to the rear end of the vehicle 100, an overall width is a width of the vehicle 100, and an overall height is a length from the bottom of the wheel to the roof of the vehicle 100. In the following description, an overall length direction L may be a direction based on which the overall length of the vehicle 100 is measured, an overall width direction W may be a direction based on which the overall width of the vehicle 100 is measured, and an overall height direction H may be a direction based on which the overall height of the vehicle 100 is measured.

The vehicle 100 may be an autonomous vehicle. The vehicle 100 may be controlled so as to travel autonomously by a controller 170. The vehicle 100 may travel autonomously based on vehicle traveling information.

The vehicle traveling information is acquired or provided through various units of the vehicle 100. The vehicle traveling information may be used for a controller 170 or an operation system 700 to control the vehicle 100.

The vehicle traveling information may include at least one of object information acquired by an object detection device 300, communication information that a communication device 400 receives from an external communication device, user input received by a User Interface (UI) device 200 or a maneuvering device 500, navigation information provided by a navigation system 770, sensing information provided by a sensing unit 120, or stored information stored in a memory 140.

The vehicle traveling information may be acquired through at least one of the user interface device 200, the object detection device 300, the communication device 400, the maneuvering device 500, the navigation system 770, the sensing unit 120, the interface 130, or the memory 140, and may be provided to the controller 170 or the operation system 700. The controller 170 or the operation system 700 may control autonomous driving of the vehicle 100 based on the vehicle traveling information.

The object information is information about an object sensed by the object detection device 300. For example, the object information may be information about the shape, location, size, and color of the object. For example, the object information may be information about a lane, an image drawn on a road surface, an obstacle, another vehicle, a pedestrian, a signal lamp, a structure, a traffic sign, and so on.

The communication information received by the communication device 400 may be information that a communicable external device transmits. For example, the communication information may include at least one of information transmitted by another vehicle, information transmitted by a mobile terminal, information transmitted by traffic infrastructure, or information present in a specific network. The traffic infrastructure may include a traffic light device, and the traffic light device may transmit information about a traffic signal.

Further, the vehicle traveling information may include at least one of information about states of various devices in the vehicle 100 or information about the location of the vehicle 100. For example, the vehicle traveling information may include information about errors of various devices in the vehicle 100, information about operational states of various devices in the vehicle 100, information about a traveling lane of the vehicle 100, map information, and so on.

For example, the controller 170 or the operation system 700 may determine the type, location, and movement of an object around the vehicle 100 based on vehicle traveling information. The controller 170 or the operation system 700 may determine, based on the vehicle traveling information, the possibility of a collision between the vehicle and an object, the type of road on which the vehicle 100 is traveling, a traffic signal around the vehicle 100, movement of the vehicle 100, and so on.

In the vehicle traveling information, information about an ambient environment or situation of the vehicle may be referred to as ambient environment information or ambient situation information.

Passenger information is information about a passenger in the vehicle 100. In the vehicle traveling information, information about a passenger of the vehicle 100 may be referred to as passenger information.

The passenger information may be acquired through an internal camera 220 or a biometric sensing unit 230. In this case, the passenger information may include at least one of a captured image of a passenger of the vehicle 100 or biometric information about the passenger.

For example, the passenger information may be an image of the passenger acquired through the internal camera 220. For example, the biometric information may be information about a body temperature, a heartbeat, and brain waves of the passenger, acquired through the biometric sensing unit 230.

For example, the controller 170 may determine the position, shape, gaze, face, motion, expression, drowsiness, health state, and emotional state of the passenger, based on the passenger information.

Further, the passenger information may be transmitted from a mobile terminal of the passenger to the communication device 400. For example, the passenger information may be authentication information by which to authenticate the passenger.

The passenger information may be acquired through a passenger sensing unit 240 or the communication device 400 and may be provided to the controller 170. The passenger information may be conceptually included in the vehicle traveling information.

The vehicle state information may be information related to states of a plurality of units in the vehicle 100. In the vehicle traveling information, information related to states of the units in the vehicle 100 may be referred to as vehicle state information.

For example, the vehicle state information may include information about operational states and errors of the user interface device 200, the object detection device 300, the communication device 400, the maneuvering device 500, the vehicle driving device 600, the operation system 700, the navigation system 770, the sensing unit 120, the interface 130, and the memory 140.

The controller 170 may determine operations or errors of a plurality of units in the vehicle 100 based on the vehicle state information. For example, the controller 170 may determine based on the vehicle state information whether a Global Positioning System (GPS) signal is received normally in the vehicle 100, whether an error has occurred in at least one sensor in the vehicle 100, or whether each device of the vehicle 100 operates normally.

The vehicle state information may be conceptually included in the vehicle traveling information.

The control mode of the vehicle 100 may be a mode indicating an entity responsible for controlling the vehicle 100.

For example, the control mode of the vehicle 100 may include an autonomous driving mode in which the controller 170 or the operation system 700 of the vehicle 100 controls the vehicle 100, a manual mode in which a driver aboard the vehicle 100 controls the vehicle 100, and a remote control mode in which a device other than the vehicle 100 controls the vehicle 100.

If the vehicle 100 is placed in the autonomous driving mode, the controller 170 or the operation system 700 may control the vehicle 100 based on vehicle traveling information. Accordingly, the vehicle 100 may drive without receiving a user command through the maneuvering device 500. For example, the vehicle 100 may drive based on information, data, or signals generated from a driving system 710, a park-out system 740, and a park-in system 750.

If the vehicle 100 is placed in the manual mode, the vehicle 100 may be controlled according to a user command requesting at least one of steering, acceleration, or deceleration, received through the maneuvering device 500. In this case, the maneuvering device 500 may generate an input signal corresponding to the user command, and may provide the generated input signal to the controller 170. The controller 170 may control the vehicle 100 based on the input signal received from the maneuvering device 500.

If the vehicle 100 is placed in the remote control mode, a device other than the vehicle 100 may control the vehicle 100. If the vehicle 100 is driven in the remote control mode, the vehicle 100 may receive a remote control signal from another device through the communication device 400. The vehicle 100 may be controlled based on the remote control signal.

The vehicle 100 may enter one of the autonomous driving mode, the manual mode, and the remote control mode based on user input received through the user interface device 200.

The control mode of the vehicle 100 may be switched to one of the autonomous driving mode, the manual mode, and the remote control mode based on vehicle traveling information. For example, the control mode of the vehicle 100 may be switched from the manual mode to the autonomous driving mode or from the autonomous driving mode to the manual mode based on object information generated from the object detection device 300. The control mode of the vehicle 100 may be switched from the manual mode to the autonomous driving mode or from the autonomous driving mode to the manual mode based on information received through the communication device 400.

As illustrated in FIG. 7, the vehicle 100 may include the user interface device 200, the object detection device 300, the communication device 400, the maneuvering device 500, the vehicle driving device 600, the operation system 700, the navigation system 770, the sensing unit 120, the interface 130, the memory 140, the controller 170, and a power supply unit 190. In some implementations, the vehicle 100 may further include a new component in addition to the components described in the present disclosure, or may not include some of the described components.

The user interface device 200 is a device used to enable the vehicle 100 to communicate with a user. The user interface device 200 may receive user input and provide information generated from the vehicle 100 to the user. The vehicle 100 may implement User Interfaces (UIs) or a User Experience (UX) through the user interface device 200.

The user interface device 200 may include an input unit 210, the internal camera 220, the biometric sensing unit 230, an output unit 250, and an interface processor 270.

In some implementations, the user interface device 200 may further include a new component in addition to the above-described components, or may not include some of the above-described components.

The input unit 210 is used to receive a user command from a user. Data collected by the input unit 210 may be analyzed by the interface processor 270, and may be recognized as a control command from the user.

The input unit 210 may be disposed inside the vehicle 100. For example, the input unit 210 may be disposed in a portion of a steering wheel, a portion of an instrument panel, a portion of a seat, a portion of a pillar, a portion of a door, a portion of a center console, a portion of a head lining, a portion of a sun visor, a portion of a windshield, a portion of a window, or the like.

The input unit 210 may include a voice input unit 211, a gesture input unit 212, a touch input unit 213, and a mechanical input unit 214.

The voice input unit 211 may convert a voice input of the user to an electrical signal. The converted electrical signal may be provided to the interface processor 270 or the controller 170.

The voice input unit 211 may include one or more microphones.

The gesture input unit 212 may convert a gesture input of the user to an electrical signal. The converted electrical signal may be provided to the interface processor 270 or the controller 170.

The gesture input unit 212 may include at least one of an infrared (IR) sensor or an image sensor for sensing a gesture input of the user.

In some implementations, the gesture input unit 212 may sense a three-dimensional gesture input of the user. To this end, the gesture input unit 212 may include a light output unit for emitting a plurality of infrared rays or a plurality of image sensors.

The gesture input unit 212 may sense a three-dimensional gesture input of the user using Time of Flight (TOF), structured light, or disparity.

The touch input unit 213 may convert a touch input of the user to an electrical signal. The converted electrical signal may be provided to the interface processor 270 or the controller 170.

The touch input unit 213 may include a touch sensor for sensing a touch input of the user.

In some implementations, the touch input unit 213 may be implemented as a touch screen by being integrated with a display unit 251. This touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the interface processor 270 or the controller 170.

The mechanical input unit 214 may be disposed on the steering wheel, the center fascia, the center console, the cockpit module, the door, or the like.

The passenger sensing unit 240 may sense a passenger in the vehicle 100. The passenger sensing unit 240 may include the internal camera 220 and the biometric sensing unit 230.

The internal camera 220 may acquire a vehicle interior image. The interface processor 270 may sense the state of a user based on the vehicle interior image. For example, the sensed state of the user may be the gaze, face, motion, expression, and position of the user.

The interface processor 270 may determine the gaze, face, motion, expression, and position of the user based on the vehicle interior image acquired by the internal camera 220. The interface processor 270 may determine the user's gesture based on the vehicle interior image. The result of the determination that the interface processor 270 makes based on a vehicle interior image may be referred to as passenger information. In this case, the passenger information may include information representing a gaze direction, motion, expression, gesture, and so on of the user. The interface processor 270 may provide the passenger information to the controller 170.

The biometric sensing unit 230 may acquire biometric information about a user. The biometric sensing unit 230 may include a sensor for acquiring biometric information about a user, and may acquire information about a fingerprint, heart beats, and brain waves of a user, using the sensor. The biometric information may be used to authenticate the user or determine the state of the user.

The interface processor 270 may determine the state of the user based on the biometric information about the user acquired by the biometric sensing unit 230. The state of the user that the interface processor 270 determines may be referred to as passenger information. In this case, the passenger information is information indicating whether the user has collapsed, is dozing, is upset, or is in an emergency state. The interface processor 270 may provide the passenger information to the controller 170.

The output unit 250 is intended to generate a visual output, an acoustic output, or a haptic output.

The output unit 250 may include at least one of the display unit 251, an audio output unit 252, or a haptic output unit 253.

The display unit 251 may display graphic objects corresponding to various pieces of information.

The display unit 251 may include at least one of a Liquid Crystal Display (LCD), a Thin Film Transistor-LCD (TFT LCD), an Organic Light-Emitting Diode (OLED) display, a flexible display, a three-dimensional (3D) display, or an e-ink display.

The display unit 251 may be implemented as a touch screen by forming a multi-layered structure with the touch input unit 213 or by being integrated with the touch input unit 213.

The display unit 251 may be configured as a Head Up Display (HUD). If the display unit 251 is configured as a HUD, the display unit 251 may be provided with a projection module, and may output information through an image projected onto the windshield or the window.

The display unit 251 may include a transparent display. The transparent display may be attached onto the windshield or the window.

The transparent display may have a specific transparency and may display a specific screen. In order to be transparent, the transparent display may include at least one of a transparent Thin Film Electroluminescent (TFFL) display, a transparent OLED display, a transparent LCD, a transmissive transparent display, or a transparent LED display. The transparency of the transparent display is controllable.

The user interface device 200 may include a plurality of display units 251a to 251g.

The display unit 251 may be disposed in a portion of the steering wheel, portions 251a, 251b and 251e of the instrument panel, a portion 251d of the seat, a portion 251f of the pillar, a portion 251g of the door, a portion of the center console, a portion of the head lining, or a portion of the sun visor, or may be implemented in a portion 251c of the windshield or a portion 251h of the window.

The audio output unit 252 converts an electrical signal received from the interface processor 270 or the controller 170 to an audio signal and outputs the audio signal. To this end, the audio output unit 252 may include one or more speakers.

The haptic output unit 253 generates a haptic output. For example, the haptic output is vibration. The haptic output unit 253 may vibrate the steering wheel, a safety belt, or a seat 110FL, 110FR, 110RL, or 110RR, so that a user perceives the output.

The interface processor 270 may perform overall control of each unit of the user interface device 200.

In some implementations, the user interface device 200 may include a plurality of interface processors 270 or may not include an interface processor.

If the user interface device 200 does not include an interface processor, the user interface device 200 may operate under the control of a processor of another device in the vehicle 100, or under the control of the controller 170.

The user interface device 200 may be referred to as a vehicle multimedia device.

The user interface device 200 may operate under the control of the controller 170.

The object detection device 300 is a device used to detect an object outside the vehicle 100.

The object may be any of various items related to driving of the vehicle 100.

Referring to FIGS. 5 and 6, objects O may include lanes OB10, lines defining the lanes OB10, another vehicle OB11, a pedestrian OB12, a 2-wheeled vehicle OB13, traffic signals OB14 and OB15, a curb defining a sidewalk, a light, a road, a structure, a speed bump, a geographic feature, an animal, and so on.

The lanes OB10 may include a traveling lane, a lane next to the traveling lane, and a lane in which an oncoming vehicle is traveling. The lanes OB10 may conceptually include left and right lines that define each of the lanes.

The other vehicle OB11 may be a vehicle traveling in the vicinity of the vehicle 100. The other vehicle OB11 may be a vehicle located within a predetermined distance from the vehicle 100. For example, the other vehicle OB11 may be a vehicle that precedes or follows the vehicle 100. For example, the other vehicle OB11 may be a vehicle traveling alongside the vehicle 100.

The pedestrian OB12 may be a person located in the vicinity of the vehicle 100. The pedestrian OB12 may be a person located within a predetermined distance from the vehicle 100. For example, the pedestrian OB12 may be a person on a sidewalk or a roadway.

The 2-wheeled vehicle OB13 may refer to a transportation apparatus that can move on two wheels around the vehicle 100. The 2-wheeled vehicle OB13 may include a transportation apparatus having two wheels, located within a predetermined distance from the vehicle 100. For example, the 2-wheeled vehicle OB13 may be a motorcycle or bicycle on a sidewalk or a roadway.

The traffic signals OB14 and OB15 may include a traffic light device OB15, a traffic sign OB14, and a symbol or text drawn or written on a road surface.

The light may be light generated from a lamp of the other vehicle OB11. The light may be light generated from a street lamp. The light may be sunlight. The road may include a road surface, a curved road, an inclined road such as an uphill or downhill road, and so on. The geographic feature may include a mountain, a hill, and so on.

The structure may be an object fixed on the ground near a road. For example, the structure may include a street lamp, a street tree, a building, a telephone pole, a traffic light device, a bridge, a curb, a guard rail, and so on.

Objects may be classified into mobile objects and fixed objects. A mobile object is an object that is movable. For example, the mobile object may conceptually include another vehicle and a pedestrian. A fixed object is an object that is not movable. For example, such a fixed object may conceptually include a traffic signal, a road, a structure, and a lane.

The object detection device 300 may detect an obstacle outside the vehicle 100. The obstacle may be one of an object, a hole in a road, the starting point of an uphill road, the starting point of a downhill road, a testing pit, a speed bump, and a boundary bump. An object may be an item having a volume and a mass.

The object detection device 300 may include the camera 310, a Radio Detection and Ranging (RADAR) 320, a Light Detection and Ranging (LiDAR) 330, an ultrasonic sensor 340, an infrared sensor 350, and a detection processor 370.

In some implementations, the object detection device 300 may further include a new component in addition to the above-described components or may not include some of the above-described components.

In order to acquire a vehicle exterior image, the camera 310 may be disposed at an appropriate position on the exterior of the vehicle. The camera 310 may provide the acquired image to the detection processor 370. The camera 310 may be a mono camera, a stereo camera 310a, an Around View Monitoring (AVM) camera 310b, or a 360-degree camera.

For example, in order to acquire an image of a front view of the vehicle, the camera 310 may be disposed in the vicinity of a front windshield inside the vehicle. Alternatively, the camera 310 may be disposed around a front bumper or a radiator grill.

For example, in order to acquire an image of a rear view of the vehicle, the camera 310 may be disposed in the vicinity of a rear glass inside the vehicle. Alternatively, the camera 310 may be disposed around a rear bumper, a trunk, or a tailgate.

For example, in order to acquire an image of a side view of the vehicle, the camera 310 may be disposed in the vicinity of at least one of side windows inside the vehicle. Alternatively, the camera 310 may be disposed near a side mirror, a fender, or a door.

The RADAR 320 may include an electromagnetic wave transmitter and an electromagnetic wave receiver. The RADAR 320 may be implemented as pulse RADAR or continuous wave RADAR based on the principle by which an electronic wave is emitted. The RADAR 320 may be implemented as Frequency Modulated Continuous Wave (FMCW)-type RADAR or Frequency Shift Keying (FSK)-type RADAR as a continuous wave RADAR scheme according to a signal waveform.

The RADAR 320 may detect an object through the medium of an electromagnetic wave by employing a Time of Flight (TOF) scheme or a phase-shift scheme, and may detect a location, distance, and relative speed of the detected object.

The RADAR 320 may be disposed at an appropriate position on the exterior of the vehicle in order to sense an object ahead of, behind, or beside the vehicle.

The LiDAR 330 may include a laser transmitter and a laser receiver. The LiDAR 330 may be implemented in a TOF scheme or a phase-shift scheme. The LiDAR 330 may be implemented in a driven or non-driven manner.

If the LiDAR 330 is implemented in a driven manner, the LiDAR 330 may be rotated by a motor and may detect an object around the vehicle 100.

If the LiDAR 330 is implemented in a non-driven manner, the LiDAR 330 may detect an object within a predetermined range from the vehicle 100 through optical steering. The vehicle 100 may include a plurality of non-driven-type LiDARs 330.

The LiDAR 330 may detect an object through the medium of an electromagnetic wave by employing a TOF scheme or a phase-shift scheme, and may detect a location, distance, and relative speed of the detected object.

The LiDAR 330 may be disposed at an appropriate position on the exterior of the vehicle in order to sense an object ahead of, behind, or beside the vehicle.

The ultrasonic sensor 340 may include an ultrasonic wave transmitter and an ultrasonic wave receiver. The ultrasonic sensor 340 may detect an object using ultrasonic waves, and may detect a location, distance, and relative speed of the detected object.

The ultrasonic sensor 340 may be disposed at an appropriate position on the exterior of the vehicle in order to sense an object ahead of, behind, or beside the vehicle.

The infrared sensor 350 may include an IR transmitter and an IR receiver. The infrared sensor 350 may detect an object using IR light, and may detect a location, distance, and relative speed of the detected object.

The infrared sensor 350 may be disposed at an appropriate position on the exterior of the vehicle in order to sense an object ahead of, behind, or beside the vehicle.

The detection processor 370 may perform overall control of each unit of the object detection device 300.

The detection processor 370 may detect an object and track the detected object based on an acquired image. The detection processor 370 may perform operations including calculation of a distance to the object, calculation of a speed relative to the object, determination of a type, location, size, shape, color, and movement route of the object, and determination of the contents of detected text, through an image processing algorithm.

The detection processor 370 may detect an object and track the detected object based on electromagnetic waves that are transmitted, are reflected from the object, and then return. The detection processor 370 may perform operations including calculation of a distance to the object and calculation of a speed relative to the object based on the electromagnetic waves.

The detection processor 370 may detect an object and track the detected object based on laser light that is transmitted, is reflected from the object, and then returns. The detection processor 370 may perform operations including calculation of a distance to the object and calculation of a speed relative to the object based on the laser light.

The detection processor 370 may detect an object and track the detected object based on ultrasonic waves that are transmitted, are reflected from the object, and then return. The detection processor 370 may perform operations including calculation of a distance to the object and calculation of a speed relative to the object based on the ultrasonic waves.

The detection processor 370 may detect an object and track the detected object based on IR light that is transmitted, is reflected from the object, and then returns. The detection processor 370 may perform operations including calculation of a distance to the object and calculation of a speed relative to the object based on the IR light.

The detection processor 370 may generate object information based on at least one of an image acquired through the camera 310, reflected electromagnetic waves received through the RADAR 320, reflected laser light received through the LiDAR 330, reflected ultrasonic waves received through the ultrasonic sensor 340, or reflected IR light received through the infrared sensor 350.

The object information may be information about a type, location, size, shape, color, movement route, and speed of an object around the vehicle 100, and the contents of detected text.

For example, the object information may indicate whether there is another lane near the vehicle 100, whether another vehicle near the vehicle 100 is moving while the vehicle 100 is stationary, whether there is a stop area around the vehicle 100, whether there is any possibility of a collision between the vehicle 100 and an object, the distribution of pedestrians or bicycles around the vehicle 100, the type of road on which the vehicle 100 is traveling, the state of a traffic light near the vehicle 100, movement of the vehicle 100, and so on. The object information may be included in vehicle traveling information.

The detection processor 370 may provide the generated object information to the controller 170.

In some implementations, the object detection device 300 may include a plurality of detection processors 370 or may not include a detection processor. For example, each of the camera 310, the RADAR 320, the LiDAR 330, the ultrasonic sensor 340, and the infrared sensor 350 may include an individual processor dedicated thereto.

The object detection device 300 may operate under the control of a processor of a device in the vehicle 100 or under the control of the controller 170.

The communication device 400 is used to communicate with an external device. The external device may be one of another vehicle, a mobile terminal, a wearable device, and a server. The communication device 400 may include at least one of a transmission antenna and a reception antenna, for communication, and a Radio Frequency (RF) circuit and device, for implementing various communication protocols.

The communication device 400 may include a short-range communication unit 410, a location information unit 420, a V2X communication unit 430, an optical communication unit 440, a broadcasting transceiver unit 450, an Intelligent Transport System (ITS) communication unit 460, and a communication processor 470.

In some implementations, the communication device 400 may further include a new component in addition to the above-described components, or may not include some of the above-described components.

The short-range communication unit 410 is a unit for performing short-range communication. The short-range communication unit 410 may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (Wireless USB).

The short-range communication unit 410 may conduct short-range communication between the vehicle 100 and at least one external device by establishing wireless area networks.

The location information unit 420 is a unit configured to acquire information about the location of the vehicle 100. For example, the location information unit 420 may include at least one of a Global Positioning System (GPS) module, a Differential Global Positioning System (DGPS) module, or a Carrier phase Differential Global Positioning System (CDGPS) module.

The location information unit 420 may acquire GPS information through the GPS module. The location information unit 420 may provide the acquired GPS information to the controller 170 or the communication processor 470. The GPS information acquired by the location information unit 420 may be used for autonomous driving of the vehicle 100. For example, the controller 170 may control autonomous driving of the vehicle 100 based on GPS information and navigation information acquired through the navigation system 770.

The V2X communication unit 430 is a unit used for wireless communication with a server (Vehicle to Infrastructure (V2I)), another vehicle (Vehicle to Vehicle (V2V)), or a pedestrian (Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device via light. The optical communication unit 440 may include an optical transmitter for converting an electrical signal to an optical signal and radiating the optical signal to the outside, and an optical receiver for converting a received optical signal to an electrical signal.

In some implementations, the optical transmitter may be integrated with a lamp included in the vehicle 100.

The broadcasting transceiver unit 450 is a unit used to receive a broadcast signal from an external broadcasting management server or transmit a broadcast signal to the broadcasting management server through a broadcast channel. The broadcast channel may include a satellite channel and a terrestrial channel. The broadcast signal may include a TV broadcast signal, a radio broadcast signal, and a data broadcast signal.

The ITS communication unit 460 communicates with a server that provides an ITS. The ITS communication unit 460 may receive various information about the state of traffic from a server of an ITS. The information about the state of traffic may include information about a traffic congestion degree, the state of traffic on individual roads, congestion of individual segments, and so on.

The communication processor 470 may perform overall control of each unit of the communication device 400.

Vehicle traveling information may include information received through at least one of the short-range communication unit 410, the location information unit 420, the V2X communication unit 430, the optical communication unit 440, the broadcasting transceiver unit 450, or the ITS communication unit 460.

For example, the vehicle traveling information may include information about a location, a type, a traveling lane, a speed, and various sensing values of another vehicle, received from the other vehicle. Upon receipt of information about various sensing values of the other vehicle through the communication device 400, the controller 170 may acquire information about various objects around the vehicle 100 without a sensor.

For example, the vehicle traveling information may indicate a type, location, and movement of an object around the vehicle 100, whether there is another lane near the vehicle 100, whether another vehicle near the vehicle 100 is moving while the vehicle 100 is stationary, whether there is a stop area around the vehicle 100, whether there is any possibility of a collision between the vehicle 100 and an object, the distribution of pedestrians or bicycles around the vehicle 100, a type of road on which the vehicle 100 is traveling, the state of a traffic light near the vehicle 100, movement of the vehicle 100, and so on.

In some implementations, the communication device 400 may include a plurality of communication processors 470 or may not include a communication processor.

If the communication device 400 does not include a communication processor, the communication device 400 may operate under the control of a processor of another device in the vehicle 100 or under the control of the controller 170.

The communication device 400 may be configured as a vehicle multimedia device, together with the user interface device 200. In this case, the vehicle multimedia device may be referred to as a telematics device or an Audio Video Navigation (AVN) device.

The communication device 400 may operate under the control of the controller 170.

The maneuvering device 500 is a device used to receive a user command for driving the vehicle.

In the manual mode, the vehicle 100 may drive based on a signal provided by the maneuvering device 500.

The maneuvering device 500 may include the steering input device 510, an acceleration input device 530, and a brake input device 570.

The steering input device 510 may receive a user command for steering the vehicle 100 from the user. The user command for steering may be a command corresponding to a specific steering angle. For example, the user command for steering may correspond to 45 degrees to the right.

The steering input device 510 may be configured in the form of a wheel for enabling steering input by being rotated. In this case, the steering input device 510 may be referred to as a steering wheel or a handle.

In some implementations, the steering input device 510 may be configured as a touch screen, a touchpad, or a button.

The acceleration input device 530 may receive a user command for acceleration of the vehicle 100 from the user. The brake input device 570 may receive a user command for deceleration of the vehicle 100 from the user. The acceleration input device 530 and the brake input device 570 may be configured as pedals.

In some implementations, the acceleration input device 530 or the brake input device 570 may be configured as a touch screen, a touchpad, or a button.

The maneuvering device 500 may operate under the control of the controller 170.

The vehicle driving device 600 is a device used to electrically control the operation of various devices of the vehicle 100.

The vehicle driving device 600 may include a powertrain driving unit 610, a chassis driving unit 620, a door/window driving unit 630, a safety device driving unit 640, a lamp driving unit 650, and an air conditioner driving unit 660.

In some implementations, the vehicle driving device 600 may further include a new component in addition to the above-described components or may not include some of the above-described components.

The vehicle driving device 600 may include a processor. Each unit of the vehicle driving device 600 may include a respective processor therefor.

The powertrain driving unit 610 may control the operation of a powertrain device.

The powertrain driving unit 610 may include a power source driving unit 611 and a transmission driving unit 612.

The power source driving unit 611 may control a power source of the vehicle 100.

For example, if the power source is a fossil fuel-based engine, the power source driving unit 611 may perform electronic control of the engine. Therefore, the power source driving unit 611 may control the output torque of the engine. The power source driving unit 611 may adjust the engine output torque under the control of the controller 170.

For example, if the power source is an electrical energy-based motor, the power source driving unit 611 may control the motor. The power source driving unit 611 may adjust the rotational speed, torque, and so on of the motor under the control of the controller 170.

The transmission driving unit 612 may control a transmission.

The transmission driving unit 612 may adjust the state of the transmission. The transmission driving unit 612 may switch the state of the transmission to a drive (D) mode, a reverse (R) mode, a neutral (N) mode, or a parking (P) mode. If the power source is an engine, the transmission driving unit 612 may adjust the engagement state of a gear in the drive (D) mode.

The chassis driving unit 620 may control the operation of a chassis device.

The chassis driving unit 620 may include a steering driving unit 621, a brake driving unit 622, and a suspension driving unit 623.

The steering driving unit 621 may perform electronic control of a steering device in the vehicle 100. The steering driving unit 621 may change a moving direction of the vehicle 100.

The brake driving unit 622 may perform electronic control of a brake device in the vehicle 100. For example, the brake driving unit 622 may decrease the speed of the vehicle 100 by controlling the operation of a brake disposed at a wheel.

The brake driving unit 622 may control a plurality of brakes individually. The brake driving unit 622 may independently control the braking power applied to each of a plurality of wheels.

The suspension driving unit 623 may perform electronic control of a suspension device in the vehicle 100. For example, if a road is bumpy, the suspension driving unit 623 may control the suspension device to reduce the vibration of the vehicle 100.

The suspension driving unit 623 may control a plurality of suspensions individually.

The door/window driving unit 630 may perform electronic control of a door device or a window device in the vehicle 100.

The door/window driving unit 630 may include a door driving unit 631 and a window driving unit 632.

The door driving unit 631 may perform control of a door device. The door driving unit 631 may control the opening or closing of a plurality of doors in the vehicle 100. The door driving unit 631 may control the opening or closing of the trunk or the tailgate. The door driving unit 631 may control the opening or closing of the sunroof.

The window driving unit 632 may perform electronic control of a window device. The window driving unit 632 may control the opening or closing of a plurality of windows in the vehicle 100.

The safety device driving unit 640 may perform electronic control of various safety devices in the vehicle 100.

The safety device driving unit 640 may include an airbag driving unit 641, a seatbelt driving unit 642, and a pedestrian protection device driving unit 643.

The airbag driving unit 641 may perform electronic control of an airbag device in the vehicle 100. For example, the airbag driving unit 641 may control the inflation of an airbag upon sensing an emergency situation.

The seatbelt driving unit 642 may perform electronic control of a seatbelt device in the vehicle 100. For example, the seatbelt driving unit 642 may control seatbelts to secure passengers on the seats 110FL, 110FR, 110RL, and 110RR, upon sensing an emergency situation.

The pedestrian protection device driving unit 643 may perform electronic control of a hood lift and a pedestrian airbag. For example, the pedestrian protection device driving unit 643 may control hood lift-up and inflation of the pedestrian airbag upon sensing a collision with a pedestrian.

The lamp driving unit 650 may perform electronic control of various lamp devices in the vehicle 100.

The air conditioner driving unit 660 may perform electronic control of an air conditioner in the vehicle 100. For example, if a vehicle internal temperature is high, the air conditioner driving unit 660 may control the air conditioner to operate and supply cool air into the vehicle 100.

The vehicle driving device 600 may include a processor. Each unit of the vehicle driving device 600 may include a respective processor dedicated thereto.

The vehicle driving device 600 may operate under the control of the controller 170.

The operation system 700 is a system that controls various operations of the vehicle 100. The operation system 700 may operate in the autonomous driving mode. The operation system 700 may perform autonomous driving of the vehicle 100 based on location information and navigation information about the vehicle 100. The operation system 700 may include a driving system 710, a park-out system 740, and a park-in system 750.

In some implementations, the operation system 700 may further include a new component in addition to the above-described components or may not include some of the above-described components.

The operation system 700 may include a processor. Each unit of the operation system 700 may include a respective processor dedicated thereto.

In some implementations, if the operation system 700 is implemented in software, the operation system 700 may be a component subordinate to the controller 170.

In some implementations, the operation system 700 may conceptually include at least one of the user interface device 200, the object detection device 300, the communication device 400, the vehicle driving device 600, or the controller 170.

The driving system 710 may control autonomous driving of the vehicle 100.

The driving system 710 may provide a control signal to the vehicle driving device 600 based on vehicle traveling information, so that the vehicle 100 travels. The vehicle driving device 600 may operate based on the control signal received from the driving system 710. Therefore, the vehicle 100 may travel autonomously.

For example, the driving system 710 may perform driving of the vehicle 100 by providing a control signal to the vehicle driving device 600 based on object information received from the object detection device 300.

For example, the driving system 710 may perform driving of the vehicle 100 by receiving a signal from an external device through the communication device 400 and providing a control signal to the vehicle driving device 600.

The park-out system 740 may control automatic park-out of the vehicle 100.

The park-out system 740 may provide a control signal to the vehicle driving device 600 based on vehicle traveling information so that the vehicle 100 leaves. The vehicle driving device 600 may operate based on a control signal received from the park-out system 740. Therefore, the vehicle 100 may leave automatically.

For example, the park-out system 740 may perform park-out of the vehicle 100 by providing a control signal to the vehicle driving device 600 based on object information received from the object detection device 300.

For example, the park-out system 740 may perform park-out of the vehicle 100 by receiving a signal from an external device through the communication device 400 and providing a control signal to the vehicle driving device 600.

The park-in system 750 may control automatic park-in of the vehicle 100.

The park-in system 750 may provide a control signal to the vehicle driving device 600 based on vehicle traveling information so that the vehicle 100 parks. The vehicle driving device 600 may operate based on a control signal received from the park-in system 750. Therefore, the vehicle 100 may automatically park.

For example, the park-in system 750 may perform park-in of the vehicle 100 by providing a control signal to the vehicle driving device 600 based on object information received from the object detection device 300.

For example, the park-in system 750 may perform park-in of the vehicle 100 by receiving a signal from an external device through the communication device 400 and providing a control signal to the vehicle driving device 600.

The navigation system 770 may provide navigation information. The navigation information may include at least one of map information, set destination information, path information, information about various objects on a road, lane information, traffic information, or information about the location of a vehicle.

The navigation system 770 may include an additional memory and a processor. The memory may store navigation information. The processor may control the operation of the navigation system 770.

In some implementations, the navigation system 770 may receive information from an external device through the communication device 400 and may update pre-stored information using the received information.

In some implementations, the navigation system 770 may be classified as a low-level component subordinate to the user interface device 200.

The sensing unit 120 may sense the state of the vehicle 100. The sensing unit 120 may include a posture sensor (e.g., a yaw sensor, a roll sensor, and a pitch sensor), a collision sensor, a wheel sensor, a speed sensor, an inclination sensor, a weight sensor, a heading sensor, a yaw sensor, a gyro sensor, a position module, a vehicle forward/backward movement sensor, a battery sensor, a fuel sensor, a tire sensor, a handle-rotation-based steering sensor, a vehicle internal temperature sensor, a vehicle internal humidity sensor, an ultrasonic sensor, an illumination sensor, an accelerator pedal position sensor, a brake pedal position sensor, and so on.

The sensing unit 120 may acquire sensing signals for vehicle posture information, vehicle collision information, vehicle heading information, vehicle location information (GPS information), vehicle angle information, vehicle speed information, vehicle acceleration information, vehicle inclination information, vehicle forward/backward movement information, battery information, fuel information, tire information, vehicle lamp information, vehicle internal temperature information, vehicle internal humidity information, a steering wheel rotation angle, a vehicle external illuminance, a pressure applied to an accelerator pedal, a pressure applied to a brake pedal, and so on. The information acquired by the sensing unit 120 may be included in vehicle traveling information.

The sensing unit 120 may further include an accelerator sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, a Crank Angle Sensor (CAS), and so on.

The interface 130 may serve paths to various types of external devices connected to the vehicle 100. For example, the interface 130 may be provided with a port connectable to a mobile terminal, and may be connected to a mobile terminal through the port. In this case, the interface 130 may exchange data with the mobile terminal.

The interface 130 may serve as a path through which electrical energy is supplied to a connected mobile terminal.

If the mobile terminal is electrically connected to the interface 130, the interface 130 may supply electrical energy received from the power supply unit 190 to the mobile terminal under the control of the controller 170.

The memory 140 is electrically connected to the controller 170. The memory 140 may store basic data for a unit, control data for controlling operation of the unit, and input and output data. The memory 140 may be any of various storage devices in hardware, such as Read Only Memory (ROM), Random Access Memory (RAM), Erasable and Programmable ROM (EPROM), a flash drive, and a hard drive. The memory 140 may store various data for overall operation of the vehicle 100, such as programs for performing processing or controlling by the controller 170.

In some implementations, the memory 140 may be integrated with the controller 170 or may be configured as a low-level component subordinate to the controller 170.

The power supply unit 190 may supply power needed for operating each component under the control of the controller 170. Particularly, the power supply unit 190 may receive power from a battery in the vehicle 100.

The controller 170 may perform overall control of each unit in the vehicle 100. The controller 170 may be referred to as an Electronic Control Unit (ECU).

If the vehicle 100 is placed in the autonomous driving mode, the controller 170 may perform autonomous driving of the vehicle 100 based on information acquired through devices provided in the vehicle 100. For example, the controller 170 may control the vehicle 100 based on navigation information received from the navigation system 770 and information received from the object detection device 300 or the communication device 400. If the vehicle 100 is placed in the manual mode, the controller 170 may control the vehicle 100 based on an input signal corresponding to a user command received by the maneuvering device 500. If the vehicle 100 is placed in the remote control mode, the controller 170 may control the vehicle 100 based on a remote control signal received by the communication device 400.

Various processors and the controller 170 of the vehicle 100 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, or an electrical unit for executing other functions.

Figure 8:
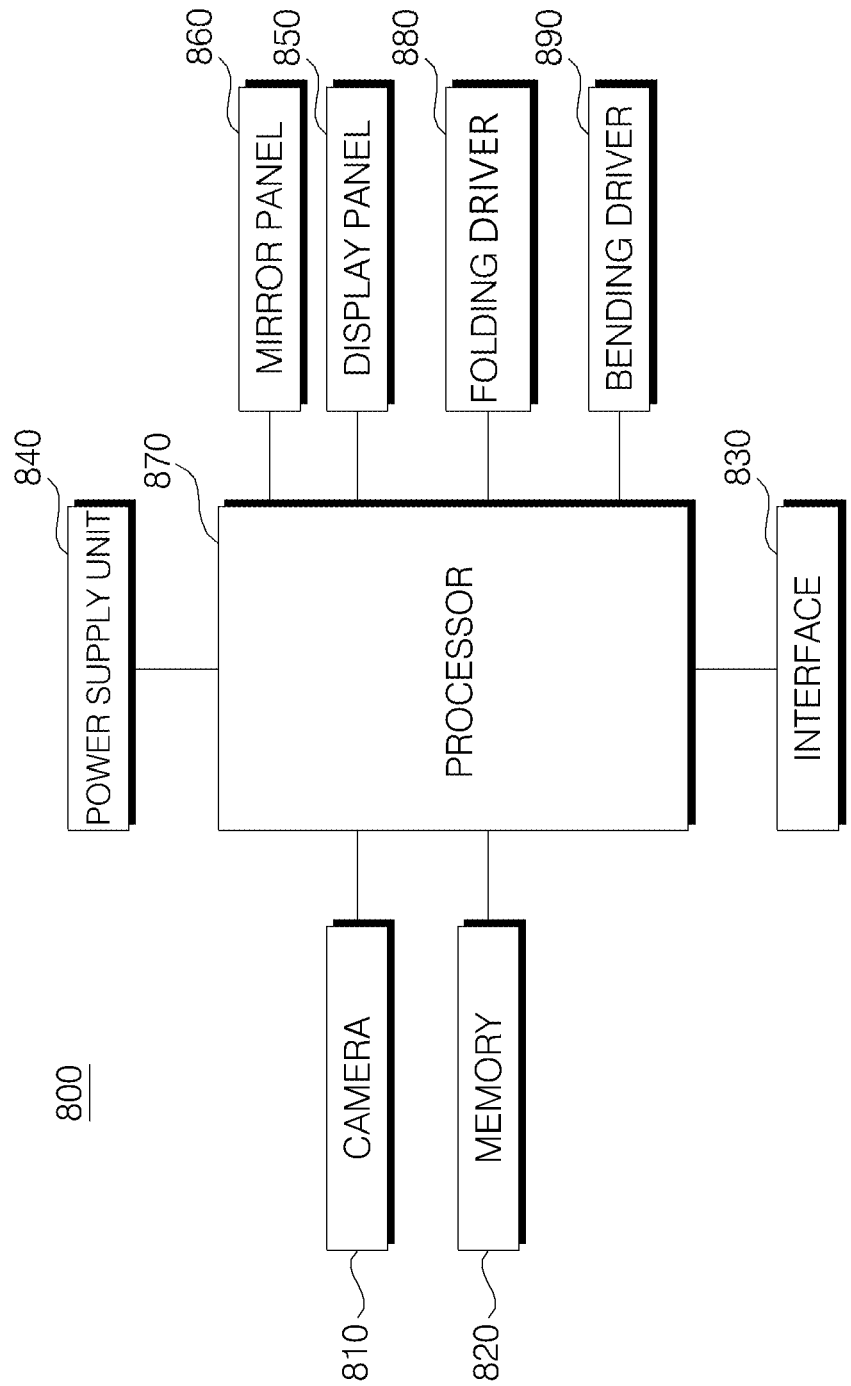
FIG. 8 is a block diagram showing example configuration of an example side mirror for a vehicle.

FIG. 8 is a block diagram of an example configuration of an example side mirror 800 for a vehicle.

The side mirror 800 may include a camera 810, a memory 820, an interface 830, a power supply unit 840, a mirror panel 860, a display panel 850, a processor 870, a folding driver 880, and a bending driver 890.

The camera 810 may capture a side-rear image of the vehicle.

The side-rear image of the vehicle may be an image showing the situation occurring in the area beside or behind the vehicle.

The camera 810 may be disposed in a portion of the side mirror 800. The camera 810 may be disposed so as to be oriented in the rear diagonal direction of the vehicle.

The camera 810 may be electrically connected to the processor 870 and may provide data corresponding to the captured image to the processor 870.

The memory 820 stores various pieces of information related to the side mirror 800.

The memory 820 may store data for each component of the side mirror 800, control data for controlling the operation of each component, and input and output data.

The memory 820 is electrically connected to the processor 870. The memory 820 may provide the stored data to the processor 870. The processor 870 may store various data in the memory 820.

In some implementations, the memory 820 may be integrated with the processor 870 or may be configured as a low-level component subordinate to the processor 870.

The memory 820 may store various data for overall operation of the side mirror 800, such as programs for performing processing or controlling by the processor 870. The memory 820 may be any of various storage devices implemented in hardware, such as ROM, RAM, EPROM, a flash drive, and a hard drive.

The interface 830 may be electrically connected to the processor 870 so as to provide various data received from the outside to the processor 870 or provide signals and data from the processor 870 to the outside.

The interface 830 may receive information from each component of the vehicle 100 and may provide the information to the processor 870.

For example, the interface 830 may acquire vehicle traveling information through at least one of the user interface device 200, the object detection device 300, the communication device 400, the maneuvering device 500, the navigation system 770, the sensing unit 120, the controller 170, or the memory 820.

The vehicle traveling information may include at least one of image information acquired through the camera 810, object information acquired by the object detection device 300, communication information that the communication device 400 receives from an external communication device, user input received through the user interface device 200 or the maneuvering device 500, navigation information provided by the navigation system 770, sensing information provided by the sensing unit 120, or stored information stored in the memory 820.

The power supply unit 840 may supply power to each component of the side mirror 800.

The power supply unit 840 may supply power needed for operating each component under the control of the processor 870.

For example, the power supply unit 840 may receive power from a battery in the vehicle.

The mirror panel 860 may be disposed in a portion of the side mirror 800.

The mirror panel 860 is a kind of mirror. For example, the mirror panel 860 may be a half mirror having a specific reflectivity and a specific transmissivity. The mirror panel 860 may be a mirror film.

The mirror panel 860 and the display panel 850 may be arranged so as to be stacked on each other. For example, the mirror panel 860 may be disposed on the front surface of the display panel 850.

If the display panel 850 is a transparent display, the mirror panel 860 may be disposed on the rear surface of the display panel 850.

The mirror panel 860 is not electrically connected to the processor 870.

The display panel 850 may be a display device. The display panel 850 may display various graphic objects.

The display panel 850 may include at least one of an LCD, a TFT LCD, an OLED display, a flexible display, a 3D display, an e-ink display, or a transparent display.

The transparent display may have a specific transparency and may display a specific screen. In order to be transparent, the transparent display may include at least one of a transparent TFFL display, a transparent OLED display, a transparent LCD, a transmissive transparent display, or a transparent LED display. The transparency of the transparent display may be adjusted under the control of the processor 870.

The display panel 850 and the mirror panel 860 may be stacked on each other.

A device that may operate as a mirror and a display device by stacking the mirror panel 860 and the display panel 850 may be referred to as a mirror-display.

The mirror-display may be implemented in various ways. For example, if the display panel 850 is an LCD, the mirror panel 860 may be a mirror film included in an upper polarizing plate of the LCD.

For example, if the mirror panel 860 is a half mirror, the mirror panel 860 may be disposed on the front surface of the display panel 850. In this case, if the display panel 850 is in an OFF state, the mirror-display may operate as a mirror. If a specific image is output from the display panel 850, both a mirror image on the mirror panel 860 and an image output from the display panel 850 may be displayed on the mirror-display.

For example, if the mirror panel 860 is a mirror and the display panel 850 is disposed on the front surface of the mirror panel 860, the display panel 850 may be a transparent display. In this case, if the display panel 850 is in an OFF state, the mirror-display may operate as a mirror. If a specific image is output from the display panel 850, both a mirror image on the mirror panel 860 and an image output from the display panel 850 may be displayed on the mirror-display.

The mirror panel 860 and the display panel 850 may be bendable panels. In this case, the mirror panel 860 and the display panel 850 may be formed of a flexible material. If the mirror panel 860 and the display panel 850 are bendable panels, the mirror panel 860 and the display panel 850 may be bent by the bending driver 890.

The bending driver 890 may bend the mirror panel 860 and the display panel 850 in the outward direction of the side mirror 800.

For example, the bending driver 890 may be disposed behind the mirror panel 860 and the display panel 850. In this case, the bending driver 890 may push the middle portion of the mirror panel 860 and the middle portion of the display panel 850 in the forward direction. Therefore, the mirror panel 860 and the display panel 850 may be bent in the outward direction of the side mirror 800.

The bending driver 890 may be electrically connected to the processor 870 and may operate in response to a control signal provided by the processor 870.

The folding driver 880 may rotate the side mirror 800.

For example, the folding driver 880 may be disposed at a connection position at which the side mirror 900 is connected to the vehicle 100.

The folding driver 880 may be electrically connected to the processor 870 and may operate in response to a control signal provided by the processor 870.

The folding driver 880 may fold or unfold the side mirror 800 based on a control signal provided by the processor 870.

The processor 870 may be electrically connected to each component of the side mirror 800 and may control each component of the side mirror 800 by providing a control signal thereto.

The processor 870 may be implemented using at least one of ASICs, DSPs, DSPDs, PLDs, FPGAs, processors, controllers, micro-controllers, microprocessors, or an electrical unit for executing other functions.

The processor 870 may enter a mirror mode or a display mode based on vehicle traveling information.

The mirror mode is a mode in which the side mirror 800 primarily operates as a mirror.

Upon entering the mirror mode, the processor 870 turns off the display panel 850. If the display panel 850 is turned off, the mirror-display provided at the side mirror 800 operates as a mirror.

The display mode is a mode in which the side mirror 800 operates as a display device.

If the processor 870 enters the display mode, the processor 870 outputs a side-rear image captured by the camera 810 on the display panel 850. Hereinafter, the term "side-rear image" refers to an image that is captured by the camera 810 and shows the situation occurring in the area beside or behind the vehicle 100. If a side-rear image is output from the display panel 850, the mirror-display provided at the side mirror 800 operates as a display device.

Upon entering the mirror mode, the processor 870 may output a variable image on a portion of the display panel 850 based on a mirror image appearing in the mirror panel 860.

A mirror image is an image reflected in the mirror panel 860 at which a driver of the vehicle 100 glances. The processor 870 may determine the mirror image observed by the driver based on the angle and location of the mirror panel 860, determined based on vehicle state information, and the gaze position of the driver, determined using the camera 810.

Upon entering the display mode, the processor 870 may provide a visual effect to a portion of a side-rear image of the vehicle based on ambient situation information.

A detailed explanation of a variable image or visual effect will be made later.

Upon determining that the camera 810 is not able to capture an image based on vehicle traveling information, the processor 870 may enter the mirror mode.

For example, upon determining that the camera 810 malfunctions based on vehicle state information, the processor 870 may determine that the camera 810 is not able to capture an image. The processor 870 may determine whether a malfunction of the camera 810 has occurred based on information about the state of the camera 810, which is included in vehicle state information.

The vehicle state information is information that indicates the state of each component of the vehicle 100 or the side mirror 800. The processor 870 may determine which component of the vehicle 100 or the side mirror 800 is malfunctioning based on vehicle state information.

The vehicle state information may be resultant data generated when the controller 170 of the vehicle 100 determines whether a specific components malfunctions. In this case, the vehicle state information may be information that indicates a concrete error in a specific component.

In some examples, upon determining that there is an error in a side-rear image based on the side-rear image and ambient situation information, the processor 870 may determine that the camera 810 is not able to capture an image. The processor 870 may determine whether there is an error in a side-rear image based on the side-rear image and ambient situation information. In some cases, the processor 870 may determine that the camera 810 is not able to capture the image because the side-rear image does not meet a predetermined quality level, for example due to poor external conditions.

Even if the camera 810 is not faulty, the camera 810 may capture an abnormal image due to the presence of foreign substances on a lens of the camera 810 or weather such as heavy rain or heavy snow. For example, the image may be blurry or dark because of weather, a light amount, air pollution, foreign substances on the camera lens.

For example, the processor 870 compares a first determination result pertaining to the ambient environment determined based on ambient situation information with a second determination result pertaining to the ambient environment determined based on a side-rear image. Upon determining that the error rate between the first determination result and the second determination result is equal to or greater than a reference error rate, the processor 870 may determine that there is an error in a side-rear image. The reference error rate is a predetermined value, which is derived through experimentation. For example, the reference error rate may be 50%.

For example, upon determining that weather conditions are bad (e.g., heavy rain or heavy snow), based on communication information, the processor 870 may determine that the camera 810 is not able to capture an image.

The communication information is information that is received by the communication device 400 of the vehicle 100. The communication information may include weather information provided by a server of the weather center. The processor 870 may receive weather information through the interface 830. The processor 870 may determine the weather around the vehicle based on the weather information.

In the mirror mode, upon determining that another vehicle is present in a Blind Spot Detection (BSD) area based on ambient situation information, the processor 870 may bend the mirror panel 860 and the display panel 850 by controlling the bending driver 890, so that the BSD area appears in a mirror image.

The BSD area refers to a blind spot within the area beside or behind the vehicle 100 that is invisible to a driver through the mirror panel 860.

The processor 870 may determine whether another vehicle is present in the BSD area based on ambient situation information.

In the mirror mode, the BSD area is invisible to a driver through the mirror panel 860. Therefore, a driver cannot see another vehicle present in the BSD area through the mirror panel 860.

When the mirror panel 860 is bent in the outward direction of the side mirror, the range that is reflected in the mirror panel 860 is widened. As the range that is reflected in the mirror panel 860 is widened, the BSD area may be reflected in the mirror panel 860 so as to be visible to a driver.

Upon determining that another vehicle is present in the BSD area, the processor 870 may bend the mirror panel 860 and the display panel 850 so that the BSD area is included in the mirror image reflected in the mirror panel 860.

The processor 870 may control the bending driver 890 so that the bending driver 890 bends the mirror panel 860 and the display panel 850.

The processor 870 may determine the degree to which the mirror panel 860 and the display panel 850 are bent (hereinafter referred to as a 'bent degree') based on the location of another vehicle present in the BSD area.

The processor 870 may determine the bent degree by which another vehicle present in the BSD area is reflected in the mirror panel 860 so as to be visible to a driver based on the location of the other vehicle present in the BSD area.

The processor 870 may provide a control signal to the bending driver 890 so that the mirror panel 860 and the display panel 850 are bent to the determined bent degree.

Upon determining that the side mirror 800 is in a folded state based on vehicle traveling information, the processor 870 may enter the display mode.

The processor 870 may determine whether the side mirror 800 is in a folded state based on vehicle state information included in vehicle traveling information.

If the side mirror 800 is in a folded state, a side rear area of the vehicle 100 is not reflected in the mirror panel 860. Therefore, the processor 870 may output a side-rear image captured by the camera 810 on the display panel 850. Accordingly, even when the side mirror 800 is in a folded state, a driver of the vehicle 100 may perceive the situation occurring in the side rear area of the vehicle 100 through a side-rear image displayed on the display panel 850.

In some examples, the side mirror 800 that includes the camera 810 can fold and unfold. When folded, the side mirror 800 may face the car window and provide a display of the image captured by the camera 810. When unfolded, the side mirror 800 may act as a mirror.

Upon determining that the number of other vehicles located in the BSD area is equal to or greater than a predetermined value based on vehicle traveling information, the processor 870 may enter the display mode.

The processor 870 may determine the number of other vehicles located in the BSD area based on ambient situation information included in vehicle traveling information.

The predetermined value is a reference value that is predetermined in order to determine whether to enter the display mode. For example, the predetermined value may be 3. In this case, upon determining that three or more other vehicles are present in the BSD area, the processor 870 enters the display mode.

The area of which an image may be captured by the camera 810 is wider than the area that is reflected in the mirror panel 860. Therefore, if the side mirror 800 enters the display mode, a driver may check an area, which is wider than an area reflected in the mirror panel 860, through a side-rear image of the vehicle.

Although not reflected in the mirror panel 860, the BSD area may appear in a side-rear image captured by the camera 810. Therefore, if the side mirror 800 enters the display mode, a driver may check the BSD area through the side-rear image of the vehicle.

Upon determining that the number of other vehicles located in a side rear area of the vehicle 100 is equal to or greater than a predetermined value based on vehicle traveling information, the processor 870 may enter the display mode. The predetermined value is a reference value that is predetermined in order to determine whether to enter the display mode. For example, the predetermined value may be 10. In this case, upon determining that ten or more other vehicles are present in a side rear area of the vehicle 100, the processor 870 enters the display mode.

If the processor 870 enters the display mode, the processor 870 outputs a side-rear image captured by the camera 810 on the display panel 850. In this case, a driver of the vehicle 100 may perceive the situation occurring in the side rear area of the vehicle 100 through the output side-rear image.

The processor 870 may enter the mirror mode or the display mode based on user input.

The processor 870 may receive user input, which is acquired through the user interface device 200 provided in the vehicle 100, through the interface 830.

Therefore, a driver of the vehicle 100 may select one of the mirror mode and the display mode.

Upon determining that a predetermined first event occurs based on vehicle traveling information, the processor 870 may output an auxiliary image, acquired through the camera 810, on a portion of the display panel 850.

For example, the first event may be the situation in which a potentially dangerous object is sensed or in which the vehicle is steered in a different direction.

The auxiliary image is an image that is additionally displayed on a portion of the display panel 850. The auxiliary image may vary based on the type of the first event.

Upon determining that a potentially dangerous object is located in a side rear area of the vehicle 100 based on ambient situation information, the processor 870 may determine that the first event occurs.

The potentially dangerous object is an object that a driver of the vehicle 100 needs to perceive.

For example, the potentially dangerous object may be an object that has a possibility equal to or higher than a predetermined reference possibility of colliding with the vehicle 100, or may be another vehicle located in the BSD area.

Based on ambient situation information, the processor 870 may determine whether an object that has a possibility equal to or higher than a predetermined reference possibility of colliding with the vehicle 100 is present. The processor 870 may determine the possibility of a collision between the vehicle 100 and an object around the vehicle 100 based on ambient situation information. If the reference possibility is 70%, the processor 870 may determine an object that may collide with the vehicle 100 with a possibility of 70% to be a potentially dangerous object.

The processor 870 may determine whether another vehicle is present in the BSD area based on ambient situation information.

Upon determining that a potentially dangerous object is located in a side rear area of the vehicle, the processor 870 may acquire an image of the potentially dangerous object through the camera 810.

In this case, the auxiliary image is an image of a potentially dangerous object. The image of a potentially dangerous object may be an image that shows the overall appearance of the potentially dangerous object.

The processor 870 may extract an area having a predetermined size, in which a potentially dangerous object appears, as an auxiliary image from the side-rear image of the vehicle acquired through the camera 810.

The processor 870 may output an image of a potentially dangerous object on a portion of the display panel 850.

In the mirror mode, the processor 870 may output an image of a potentially dangerous object on a portion of the display panel 850. In this case, a driver may view both a mirror image reflected in the mirror panel 860 and an image of a potentially dangerous object displayed on the display panel 850.

In the display mode, the processor 870 may output a side-rear image of the vehicle acquired through the camera 810 on the entire area of the display panel 850 and may output an image of a potentially dangerous object on a portion of the side-rear image.

Accordingly, a driver may perceive a potentially dangerous object through the auxiliary image. For example, a driver may monitor an object that has a high possibility of colliding with the vehicle 100 or another vehicle that is present in the BSD area through the auxiliary image.

Upon determining that the vehicle 100 is steered in a different direction based on vehicle traveling information, the processor 870 may determine that the first event occurs.

For example, the processor 870 may acquire a steering input, which is input to the steering input device 510, through the interface 830. The processor 870 may determine whether the vehicle 100 is steered in a different direction based on the steering input.

For example, the processor 870 may acquire a user input (e.g., manipulation of a turn signal), through the interface 830. Upon acquisition of a user input (e.g., manipulation of a turn signal), the processor 870 may determine that the vehicle 100 is steered in the direction indicated by the turn signal corresponding to the user input.

Upon determining that the vehicle 100 is steered in a different direction, the processor 870 may output an image of an object, which may have an increased possibility of colliding with the vehicle 100, on a portion of the display panel 850. In this case, the image of the object, which may have an increased possibility of colliding with the vehicle 100, is an auxiliary image. Based on ambient situation information, the processor 870 may determine an object that may have an increased possibility of colliding with the vehicle 100 when the vehicle 100 is steered in a different direction.

When the first event occurs, the processor 870 may determine the position on which an auxiliary image is output based on vehicle traveling information.

The processor 870 may determine a secondary area to be a position on which an auxiliary image is output.

The secondary area is an area that a driver does not need to check in a mirror image reflected in the mirror panel 860 or a side-rear image displayed on the display panel 850.

For example, the secondary area may be an area excluding a road on which the vehicle 100 is traveling in a mirror image or a side-rear image. A road on which the vehicle 100 is traveling may include a traveling lane, on which the vehicle 100 is traveling, and a lane formed next to the traveling lane and extending in the same direction as the traveling lane.

For example, the secondary area may be an area in which a lane for an oncoming vehicle is present in a mirror image or a side-rear image. The secondary area may be an area in which at least one of a tree, a building, or the sky is present in a mirror image or a side-rear image.

In the mirror mode, the processor 870 may determine a secondary area in a mirror image based on the mirror image reflected in the mirror panel 860 and on ambient situation information. For example, the processor 870 may determine an area in a mirror image, in which an oncoming lane, a tree, a building, or the sky is present, to be a secondary area based on the mirror image and ambient situation information.

In the mirror mode, the processor 870 may output an auxiliary image on a portion of a secondary area in a mirror image.

For example, in the mirror mode, the processor 870 may output an image of a potentially dangerous object on a secondary area in a mirror image.

In the display mode, the processor 870 may determine a secondary area in a side-rear image based on the side-rear image displayed on the display panel 850 and ambient situation information. For example, the processor 870 may determine an area in a side-rear image, in which an oncoming lane, a tree, a building, or the sky is present, to be a secondary area based on the side-rear image and ambient situation information.

In the display mode, the processor 870 may output an auxiliary image on a portion of a secondary area in a side-rear image.

For example, in the display mode, the processor 870 may output an image of a potentially dangerous object on a secondary area in a side-rear image.

If the size of a potentially dangerous object appearing in a mirror image or a side-rear image is equal to or less than a predetermined size, the processor 870 may output a captured enlarged image of a potentially dangerous object on a portion of the display panel 850. In this case, the captured enlarged image of a potentially dangerous object (hereinafter referred to as an 'enlarged image') is an auxiliary image.

The predetermined size is a reference value that is predetermined in order to determine whether to output an enlarged image. The predetermined size may be a value derived through experimentation.

If the size of a potentially dangerous object appearing in a mirror image or a side-rear image is equal to or less than a predetermined size, it will be difficult for a driver to perceive the potentially dangerous object. In order to obviate this problem, the side mirror 800 according to the present disclosure may output an enlarged image, whereby a driver may easily perceive a potentially dangerous object.

Based on user input, the processor 870 may control the folding driver 880 so that the side mirror 800 is folded or unfolded.

The processor 870 may acquire user input, which is input to the user interface device 200, through the interface 830. If the acquired user input is a command to fold the side mirror 800, the processor 870 may control the folding driver 880 so that the side mirror 800 is folded. If the acquired user input is a command to unfold the side mirror 800, the processor 870 may control the folding driver 880 so that the side mirror 800 is unfolded.

The processor 870 may control the folding driver 880 so that the side mirror 800 is folded or unfolded based on vehicle traveling information.

Upon determining that a predetermined second event occurs based on vehicle traveling information, the processor 870 may fold the side mirror 800.

For example, the second event may include the situation in which the number of other vehicles present in a side rear area of the vehicle 100 is equal to or greater than a predetermined value, the situation in which it is determined that the unfolded side mirror 800 will collide with an object, and the situation in which it is determined that the fuel efficiency of the vehicle 100 needs to be improved.

Upon determining that the number of other vehicles present in a side rear area of the vehicle 100 is equal to or greater than a predetermined value based on vehicle traveling information, the processor 870 may determine that the second event occurs. In this case, the predetermined value is a value that may be stored in the memory 820 and may be set by a user. For example, the predetermined value may be 5. In this case, upon determining that five or more other vehicles are present in a side rear area of the vehicle 100 based on vehicle traveling information, the processor 870 may determine that the second event occurs. At this time, the processor 870 may fold the side mirror 800.

Upon determining that the unfolded side mirror 800 will collide with an object based on vehicle traveling information, the processor 870 may determine that the second event occurs.

The processor 870 may determine whether the unfolded side mirror 800 will collide with an object based on vehicle traveling information. For example, when the vehicle 100 enters a narrow space, if the side mirror 800 is folded, a collision with an object may be prevented, whereas if the side mirror 800 is in an unfolded state, a collision with an object may occur.

Based on object information included in vehicle traveling information, the processor 870 may determine that the side mirror 800 needs to be folded in order to enter a specific space without colliding with an object. In this case, the processor 870 may determine that the second event occurs and may fold the side mirror 800. Accordingly, the side mirror 800 is folded and thus a collision between the side mirror 800 and an object may be prevented.

Upon determining that the fuel efficiency of the vehicle 100 needs to be improved based on vehicle traveling information, the processor 870 may determine that the second event occurs.

For example, based on vehicle traveling information, upon determining that the vehicle 100 enters a fuel-saving mode, that a residual fuel amount in the vehicle 100 is less than a predetermined reference fuel amount, that a residual fuel amount in the vehicle 100 is less than an estimated fuel amount necessary to reach a predetermined destination, that the vehicle 100 is traveling in an autonomous driving mode, or that the speed of the vehicle 100 is higher than a predetermined reference speed, the processor 870 may determine that the fuel efficiency of the vehicle 100 needs to be improved.

Upon determining that the fuel efficiency of the vehicle 100 needs to be improved, the processor 870 may fold the side mirror 800. If the side mirror 800 is folded, drag attributable to the side mirror 800 may be reduced, and consequently the fuel efficiency of the vehicle 100 may be improved.

Upon determining that drag attributable to the side mirror 800 needs to be reduced based on vehicle traveling information, the processor 870 may fold the side mirror 800.

Upon determining that an improvement in the fuel efficiency of the vehicle 100 is needed, the processor 870 determines that drag attributable to the side mirror 800 needs to be reduced.

If the side mirror 800 is folded, the processor 870 enters the display mode, so that a side-rear image acquired through the camera 810 is output on the display panel 850.

Upon determining that the camera 810 is not able to capture an image based on vehicle traveling information, the processor 870 may unfold the side mirror 800.

For example, upon determining that the camera 810 malfunctions based on vehicle state information, the processor 870 may determine that the camera 810 is not able to capture an image. Based on information about the state of the camera 810, which is included in vehicle state information, the processor 870 may determine whether the camera 810 is faulty.

For example, upon determining that there is an error in a side-rear image based on the side-rear image and ambient situation information, the processor 870 may determine that the camera 810 is not able to capture an image. The processor 870 may determine whether there is an error in a side-rear image based on the side-rear image and ambient situation information.

If the side mirror 800 according to the present disclosure is folded, the side mirror 800 enters the display mode. However, if the camera 810 is not able to capture an image, it is impossible to maintain the display mode. Therefore, if the camera 810 is not able to capture an image, the side mirror 800 according to the present disclosure unfolds the side mirror 800 and enters the mirror mode.

Upon determining that the camera 810 is not able to capture an image, the processor 870 may unfold the side mirror 800 and may enter the mirror mode.

When the vehicle 100 is parked while the side mirror 800 is in the folded state, the processor 870 may output at least one of an available space, a set guidance path, a predicted path on the basis of a steering angle of the steering wheel, or a predicted collision point on the basis of the predicted path on a side-rear image in an Augmented Reality (AR) manner.

The processor 870 may determine whether the vehicle 100 is being parked based on vehicle traveling information. For example, upon determining that the vehicle 100 has arrived at a predetermined destination based on vehicle traveling information, the processor 870 may determine that the vehicle 100 will be parked. For example, upon determining that the automatic parking function of the vehicle 100 is in an activated state based on vehicle traveling information, the processor 870 may determine that the vehicle 100 is being parked. For example, upon determining that the vehicle 100 is traveling at a speed lower than a predetermined speed around a parking space based on vehicle traveling information, the processor 870 may determine that the vehicle 100 is being parked.

The processor 870 enters the display mode in the folded state of the side mirror 800 and outputs a side-rear image on the display panel 850.

The processor 870 may display at least one of an available space, a set guidance path, a predicted path on the basis of a steering angle of the steering wheel, or a predicted collision point on the basis of the predicted path on a side-rear image in the AR manner. A detailed explanation thereof will be made later with reference to FIG. 18.

When the vehicle 100 is being parked while the side mirror 800 is in the unfolded state, the processor 870 may detect a parking space that is present beside the vehicle 100 based on a side-rear image.

If the side mirror 800 is unfolded, the camera 810 disposed at the side mirror 800 is oriented toward a side area of the vehicle 100, and thus may capture an image of a wider area. Therefore, in the unfolded state, the side mirror 800 according to the present disclosure detects a parking space present beside the vehicle 100 based on the side-rear image, thereby detecting a greater number of parking spaces.

If a potentially dangerous object appears in the mirror in the mirror mode, the processor 870 may output a variable image for highlighting the potentially dangerous object on a portion of the display panel 850.

The variable image may be an image for highlighting a potentially dangerous object that appears in the mirror.

For example, the variable image may be a highlight box display surrounding a potentially dangerous object, a gradation display in which an area around a potentially dangerous object is displayed with a bright color and the remaining area is displayed with a dark color, a blur display in which an area around a potentially dangerous object is displayed in sharp focus and the remaining area is blurred, or a brightness display in which an area around a potentially dangerous object is displayed with high intensity of illumination and the remaining area is displayed with low intensity of illumination.

If a variable image is displayed on the display panel 850, a mirror image reflected in the mirror panel 860 and the variable image overlap each other. Therefore, a user may view a mirror image overlapping a variable image. Since a potentially dangerous object appearing in a mirror image is highlighted, a user may easily perceive the potentially dangerous object appearing in the mirror image.

In the display mode, if a potentially dangerous object appears in a side-rear image, the processor 870 may provide a visual effect highlighting the potentially dangerous object to the side-rear image.

The visual effect is a special effect that is secondarily provided to an original image captured by the camera 810.

For example, the visual effect may be a highlight box displayed to surround a potentially dangerous object, a gradation effect in which an area around a potentially dangerous object is displayed with a bright color and the remaining area is displayed with a dark color, a blur effect in which an area around a potentially dangerous object is displayed in sharp focus and the remaining area is blurred, or a brightness effect in which an area around a potentially dangerous object is displayed with high intensity of illumination and the remaining area is displayed with low intensity of illumination.

The processor 870 may perform additional image processing on image data captured by the camera 810 so as to provide a visual effect to a side-rear image.

If a visual effect is provided to a side-rear image, a user may view a side-rear image including a visual effect by which a potentially dangerous object is highlighted. Accordingly, a potentially dangerous object appearing in a side-rear image is highlighted, and a user may therefore easily perceive a potentially dangerous object appearing in a side-rear image.

The processor 870 may determine a variable image or a visual effect based on information about a potentially dangerous object (hereinafter referred to as 'potentially dangerous object information').

The potentially dangerous object information may be information about at least one of a type, a speed, a location, a shape, a color, or a size of a potentially dangerous object, or the possibility of a collision thereof with the vehicle 100.

In the mirror mode, the processor 870 may determine at least one of a location, size, shape, color, or type of a variable image based on potentially dangerous object information.

For example, the processor 870 may determine different variable images based on the possibility of a collision between a potentially dangerous object and the vehicle 100, which is determined based on potentially dangerous object information. For example, if the possibility of a collision between a potentially dangerous object and the vehicle 100 is equal to or less than a first stage value, the processor 870 may determine the variable image to be a small green highlight box. If the possibility of a collision between a potentially dangerous object and the vehicle 100 is greater than the first stage value and equal to or less than a second stage value, the processor 870 may determine the variable image to be a medium-sized yellow highlight box. If the possibility of a collision between a potentially dangerous object and the vehicle 100 is greater than the second stage value, the processor 870 may determine the variable image to be a big red highlight box. The first stage value and the second stage value are predetermined values stored in the memory 820.

In the display mode, based on potentially dangerous object information, the processor 870 may determine the visual effect that is to be provided to a side-rear image.

For example, the processor 870 may determine different visual effects based on the type of potentially dangerous object, which is determined based on potentially dangerous object information. For example, upon determining that the type of the potentially dangerous object is a small vehicle, the processor 870 may provide a visual effect indicating the presence of the potentially dangerous object. Upon determining that the type of the potentially dangerous object is a large truck, the processor 870 may display an additional image indicating the danger.

The processor 870 may change the variable image or the visual effect based on potentially dangerous object information.

Changing the variable image may include changing at least one of a location, size, shape, color, or type of the variable image.

Changing the visual effect may include changing at least one of a location, size, shape, color, or type of an image that is added by the provision of a visual effect (hereinafter referred to as a 'visual effect image').

For example, based on the location of the potentially dangerous object, which is determined based on potentially dangerous object information, the processor 870 may change the location of the variable image or the visual effect image so that the variable image or the visual effect image is displayed around the potentially dangerous object.

For example, based on the distance between the potentially dangerous object and the vehicle 100, which is determined based on potentially dangerous object information, the processor 870 may change the size of the variable image or the visual effect image that highlights the potentially dangerous object. For example, the processor 870 may change the size of the variable image or the visual effect image so that the size of the variable image or the visual effect image is inversely proportional to the distance between the potentially dangerous object and the vehicle 100. In this case, as the distance between the potentially dangerous object and the vehicle 100 decreases, the size of the variable image or the visual effect image increases, enabling a driver to easily perceive the potentially dangerous object.

For example, upon determining that the possibility of a collision between the potentially dangerous object and the vehicle 100 increases based on potentially dangerous object information, the processor 870 may change the color of the variable image or the visual effect image that highlights the potentially dangerous object.

In the mirror mode, the processor 870 may output a variable image for blurring or darkening a secondary area in a mirror image on a portion of the display panel 850.

In the mirror mode, the processor 870 may output a variable image for blurring a secondary area in a mirror image on a portion of the display panel 850. In this case, the secondary area in the mirror image and the variable image output on the display panel 850 overlap each other, thereby blurring the secondary area.

In the mirror mode, the processor 870 may output a variable image for darkening a secondary area in a mirror image on a portion of the display panel 850. In this case, the secondary area in the mirror image and the variable image output on the display panel 850 overlap each other, thereby darkening the secondary area.

In the display mode, the processor 870 may provide a visual effect blurring or darkening a secondary area in a side-rear image.

In the display mode, the processor 870 may provide a visual effect blurring a secondary area in a side-rear image. In this case, the secondary area may be blurred in the side-rear image.

In the display mode, the processor 870 may provide a visual effect darkening a secondary area in a side-rear image. In this case, the secondary area may be darkened in the side-rear image.

The side mirror 800 according to the present disclosure may enable a user to pay attention to the area excluding a secondary area by blurring or darkening the secondary area in a mirror image or a side-rear image.

In the mirror mode, the processor 870 may output a variable image for darkening a glare area in a mirror image on a portion of the display panel 850.

The glare area is an area in a mirror image or a side-rear image, the brightness of which is equal to or higher than a predetermined reference brightness. The reference brightness is a reference value for determining whether a user suffers from glare, and is determined through experimentation. Data relevant to the reference brightness may be stored in the memory 820.

The processor 870 may determine the brightness distribution of a mirror image or a side-rear image based on the image data acquired through the camera 810. The processor 870 may determine an area, the brightness of which is equal to or higher than the reference brightness, to be a glare area based on the brightness distribution in a mirror image or a side-rear image.

If a variable image for darkening a glare area in a mirror image is output on a portion of the display panel 850, the glare area in the mirror image and the variable image output on the display panel 850 overlap each other, whereby the brightness of the glare area appearing in the mirror image may decrease.

In the display mode, the processor 870 may provide a visual effect darkening a glare area in a side-rear image. In this case, the brightness of the glare area in the side-rear image may decrease.

Figure 9:
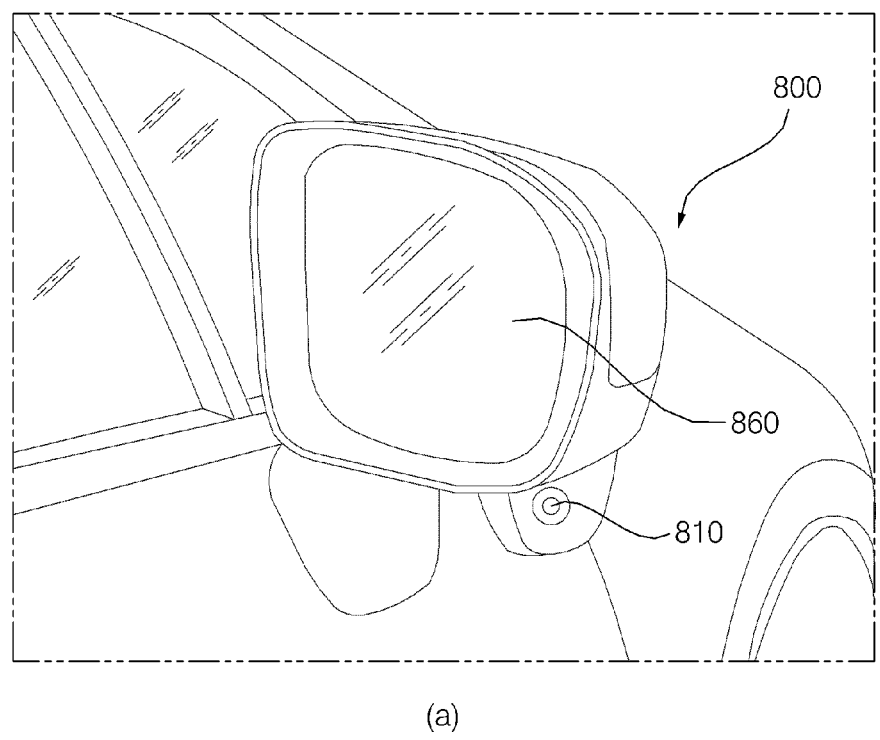
FIG. 9 is a view showing an example external appearance and an example interior of the side mirror for a vehicle.
Figure 9:
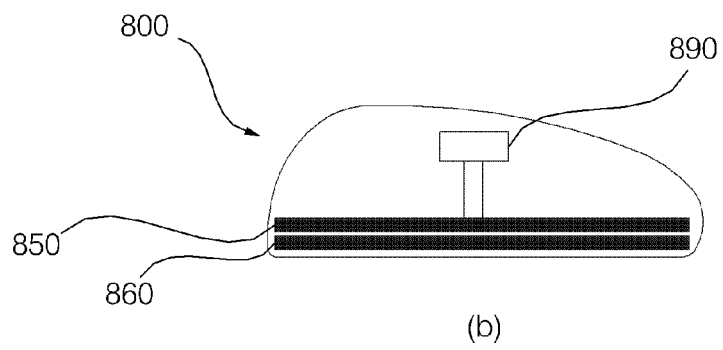

FIG. 9 illustrates an example external appearance (a) and an interior (b) of the side mirror 800 for a vehicle. Referring to (a) in FIG. 9, the side mirror 800 may be disposed at a portion of the exterior of the vehicle 100.

In the implementation illustrated in this drawing, the camera 810 is disposed at the lower portion of the side mirror 800. The camera 810 may also be disposed at the side portion or the upper portion of the side mirror 800. The position of the camera 810 is not particularly limited.

Referring to (b) in FIG. 9, the mirror panel 860 and the display panel 850 are arranged so as to be stacked on each other.

In the implementation illustrated in this drawing, the mirror panel 860 is disposed on the front surface of the display panel 850. However, the mirror panel 860 may alternatively be disposed on the rear surface of the display panel 850. In some cases, the mirror panel 860 and the display panel 850 may be partially overlapping.

If the mirror panel 860 is disposed on the front surface of the display panel 850, the mirror panel 860 is exposed outside. In this case, the mirror panel 860 may be configured as a half mirror or a mirror panel provided at a polarizing plate.

If the mirror panel 860 is disposed on the rear surface of the display panel 850, the display panel 850 is exposed outside. In this case, the display panel 850 may be a transparent display.

In the implementation illustrated in the drawing, the bending driver for bending the mirror panel 860 and the display panel 850 is disposed behind the display panel 850. In this case, the bending driver 890 moves a protruding portion thereof, which protrudes toward the mirror panel 860 and the display panel 850, in the forward-and-backward direction, thereby bending the mirror panel 860 and the display panel 850.

Alternatively, the bending driver 890 may be disposed on both sides of the mirror panel 860 and the display panel 850. In this case, the bending driver 890 applies force to a middle region, thereby bending the mirror panel 860 and the display panel 850.

Figure 10:
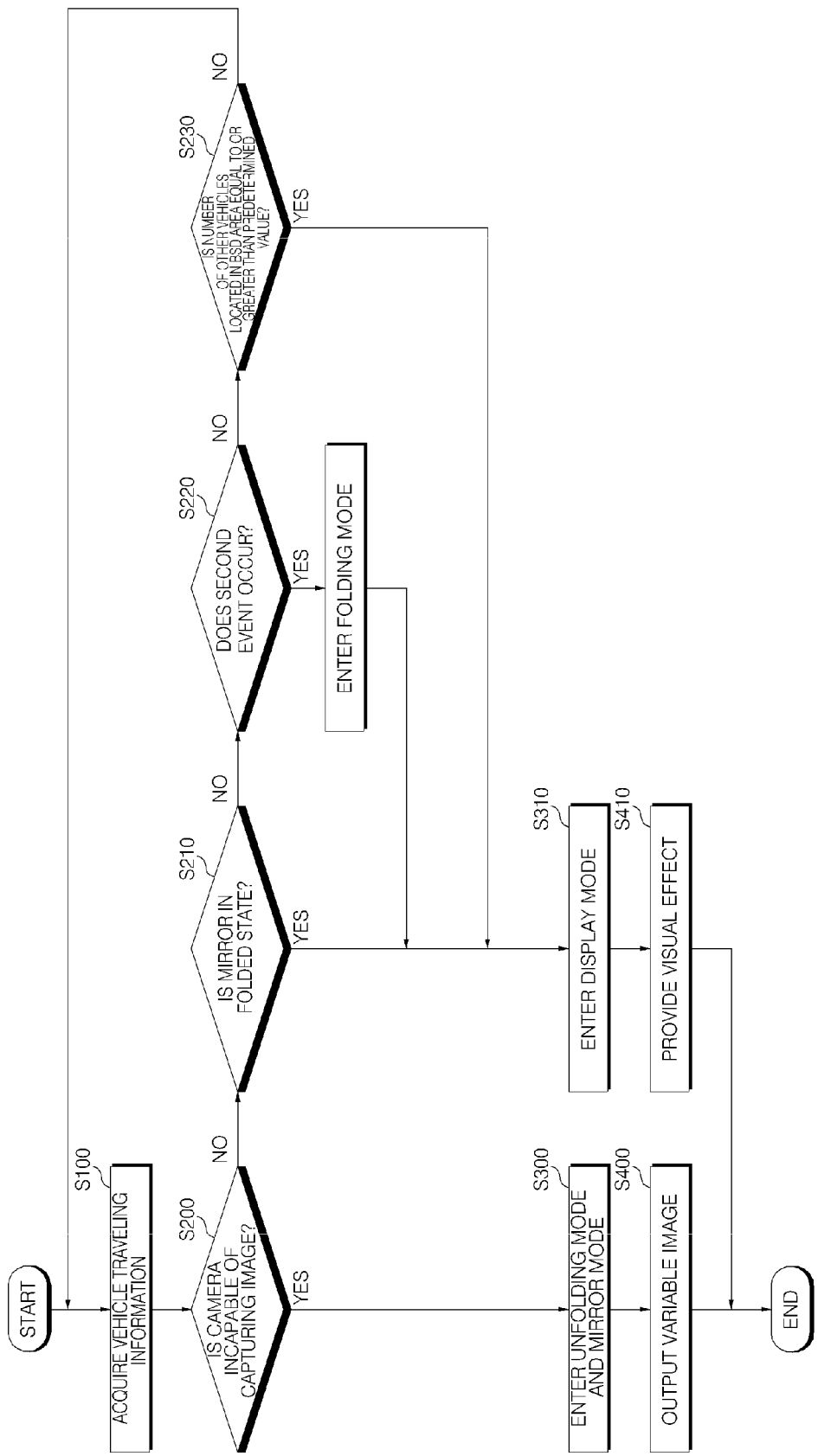
FIG. 10 is a flowchart of an example operational process of the side mirror for a vehicle.

FIG. 10 is a flowchart of an example operational process of the side mirror 800 for a vehicle.

The processor 870 may acquire vehicle traveling information through the camera 810 or the interface 830 (S100).

The vehicle traveling information may include at least one of image information acquired through the camera 810, object information acquired by the object detection device 300, communication information that the communication device 400 receives from an external communication device, user input received by the user interface device 200 or the maneuvering device 500, navigation information provided by the navigation system 770, sensing information provided by the sensing unit 120, or stored information stored in the memory 820.

The processor 870 may determine whether the camera 810 is not able to capture an image based on vehicle traveling information (S200).

For example, upon determining that the camera 810 malfunctions based on vehicle state information, the processor 870 may determine that the camera 810 is not able to capture an image. The processor 870 may determine whether a malfunction of the camera 810 has occurred based on information about the state of the camera 810, which is included in vehicle state information.

For example, upon determining that there is an error in a side-rear image based on the side-rear image and ambient situation information, the processor 870 may determine that the camera 810 is not able to capture an image. The processor 870 may determine whether there is an error in a side-rear image based on the side-rear image and ambient situation information.

Upon determining that the camera 810 is not able to capture an image, the processor 870 may enter the unfolding mode and the mirror mode (S300).

When entering the unfolding mode, the processor 870 controls the folding driver 880 so that the side mirror 800 is unfolded.

When entering the mirror mode, the processor 870 turns off the display panel 850.

Upon determining that the camera 810 is capable of capturing an image, the processor 870 may determine whether the side mirror 800 is in a folded state based on vehicle state information (S210).

Upon determining that the camera 810 is capable of capturing an image and that the side mirror 800 is in a folded state, the processor 870 may enter the display mode (S310).

Upon determining that the camera 810 is capable of capturing an image and that the side mirror 800 is not in a folded state, the processor 870 may determine whether a predetermined second event occurs based on vehicle traveling information (S220).

For example, the second event may include the situation in which the number of other vehicles present in a side rear area of the vehicle 100 is equal to or greater than a predetermined value, the situation in which it is determined that the unfolded side mirror 800 will collide with an object, and the situation in which it is determined that the fuel efficiency of the vehicle 100 needs to be improved.

Upon determining that the second event occurs, the processor 870 may enter the folding mode (S320).

Upon determining that the second event does not occur, the processor 870 may determine whether the number of other vehicles located in the BSD area is equal to or greater than a predetermined value based on ambient situation information (S230).

The predetermined value may be a reference value that is predetermined in order to determine whether to enter the display mode. For example, the predetermined value may be 3.

In this case, upon determining that three or more other vehicles are present in the BSD area, the processor 870 enters the display mode.

Upon determining that the folding mode is started or that the number of other vehicles located in the BSD area is equal to or greater than the predetermined value, the processor 870 enters the display mode (S310).

When entering the mirror mode, the processor 870 may output a variable image on a portion of the display panel 850 based on a mirror image appearing in the mirror panel 860 (S400).

When entering the display mode, the processor 870 may provide a visual effect to a portion of a side-rear image based on ambient situation information (S410).

Figure 11:
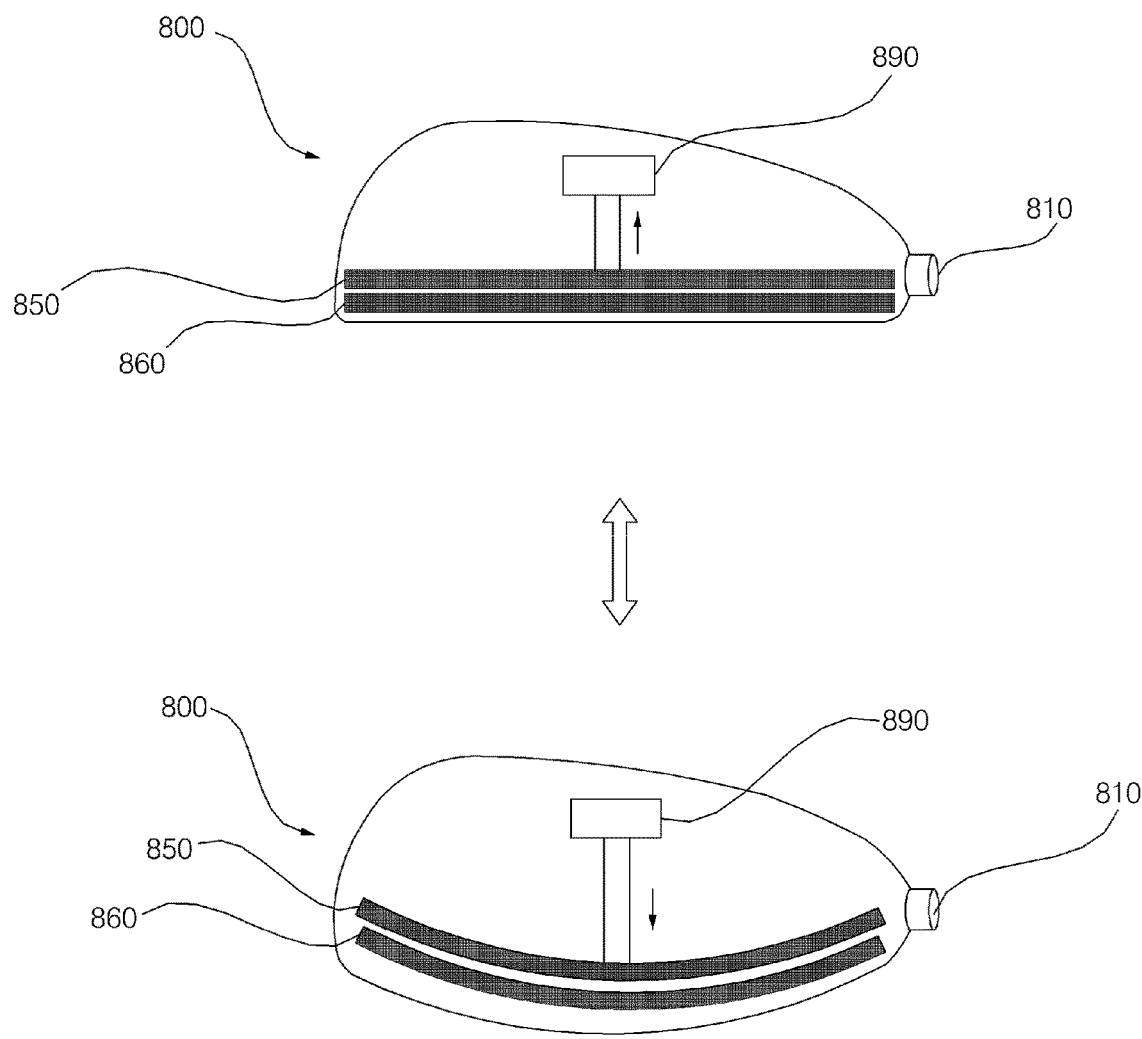
FIG. 11 is a view showing an example operation of the side mirror for a vehicle, in which an example mirror panel and an example display panel are bent by an example bending driver.

FIG. 11 illustrates an example operation of the side mirror 800 for a vehicle, in which the mirror panel 860 and the display panel 850 are bent by the bending driver 890. The mirror panel 860 and the display panel 850 may be bendable panels. In this case, the mirror panel 860 and the display panel 850 may be formed of a flexible material. If the mirror panel 860 and the display panel 850 are bendable panels, the mirror panel 860 and the display panel 850 may be bent by the bending driver 890.

The processor 870 may control the bending driver 890 so that the bending driver 890 bends the mirror panel 860 and the display panel 850. The processor 870 may provide a control signal to the bending driver 890 so as to control the same. The bending driver 890 may be electrically connected to the processor 870 and may operate in response to a control signal provided by the processor 870.

The bending driver 890 may bend the mirror panel 860 and the display panel 850 in the outward direction of the side mirror 800.

The bending driver 890 may be disposed behind the mirror panel 860 and the display panel 850.

The bending driver 890 may include a protruding portion for pushing the middle portions of the mirror panel 860 and the display panel 850 in the forward direction.

The processor 870 may provide a control signal to the bending driver 890 so that the protruding portion of the bending driver 890 moves in the forward direction or in the backward direction.

The processor 870 may control the bending driver 890 so that the protruding portion of the bending driver 890 moves in the forward direction, thereby pushing the middle portions of the mirror panel 860 and the display panel 850 in the forward direction. Accordingly, the mirror panel 860 and the display panel 850 may be bent in the outward direction of the side mirror 800.

The processor 870 may control the bending driver 890 so that the protruding portion of the bending driver 890 moves in the backward direction, thereby restoring the bent mirror panel 860 and the bent display panel 850 to their original shapes.

Unlike the configuration illustrated in the drawing, the bending driver 890 may be disposed on both sides of the mirror panel 860 and the display panel 850. In this case, the bending driver 890 applies force to a middle region, thereby bending the mirror panel 860 and the display panel 850.

Figure 12:
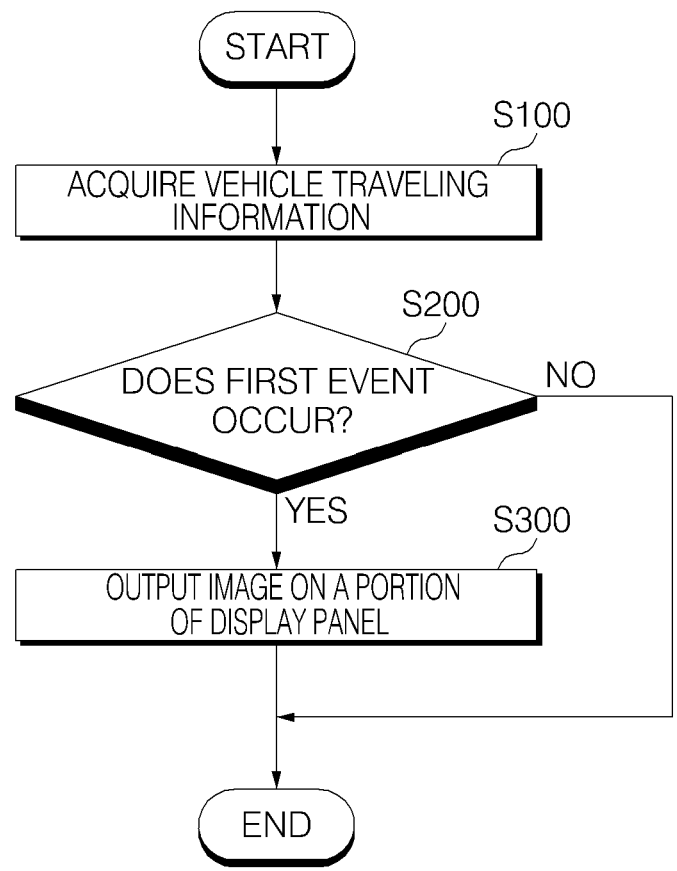
FIG. 12 is a flowchart of an example operational process of the side mirror for a vehicle.

FIG. 12 is a flowchart for explaining the operational process of the side mirror 800 for a vehicle.

The processor 870 may acquire vehicle traveling information through the camera 810 or the interface 830 (S100).

The processor 870 may determine whether a predetermined first event occurs based on vehicle traveling information (S200).

For example, the first event may be the situation in which a potentially dangerous object is sensed or in which the vehicle is steered in a different direction.

Upon determining that a potentially dangerous object is located in a side rear area of the vehicle 100 based on ambient situation information, the processor 870 may determine that the first event occurs.

Upon determining that the vehicle 100 is steered in a different direction based on vehicle traveling information, the processor 870 may determine that the first event occurs.

Upon determining that the first event occurs, the processor 870 may output an auxiliary image, acquired through the camera 810, on a portion of the display panel 850 (S300).

The auxiliary image is an image that is additionally displayed on a portion of the display panel 850. The auxiliary image may vary based on the type of the first event.

Upon determining that a potentially dangerous object is located in a side rear area of the vehicle, the processor 870 may acquire an image of the potentially dangerous object through the camera 810. In this case, the auxiliary image is an image of a potentially dangerous object. The image of a potentially dangerous object may be an image that shows the overall appearance of the potentially dangerous object. The processor 870 may output an image of a potentially dangerous object on a portion of the display panel 850.

Upon determining that the vehicle 100 is steered in a different direction, the processor 870 may output an image of an object that has an increased possibility of colliding with the vehicle 100 on a portion of the display panel 850. In this case, the image of the object that has an increased possibility of colliding with the vehicle 100 is an auxiliary image.

Figure 13:
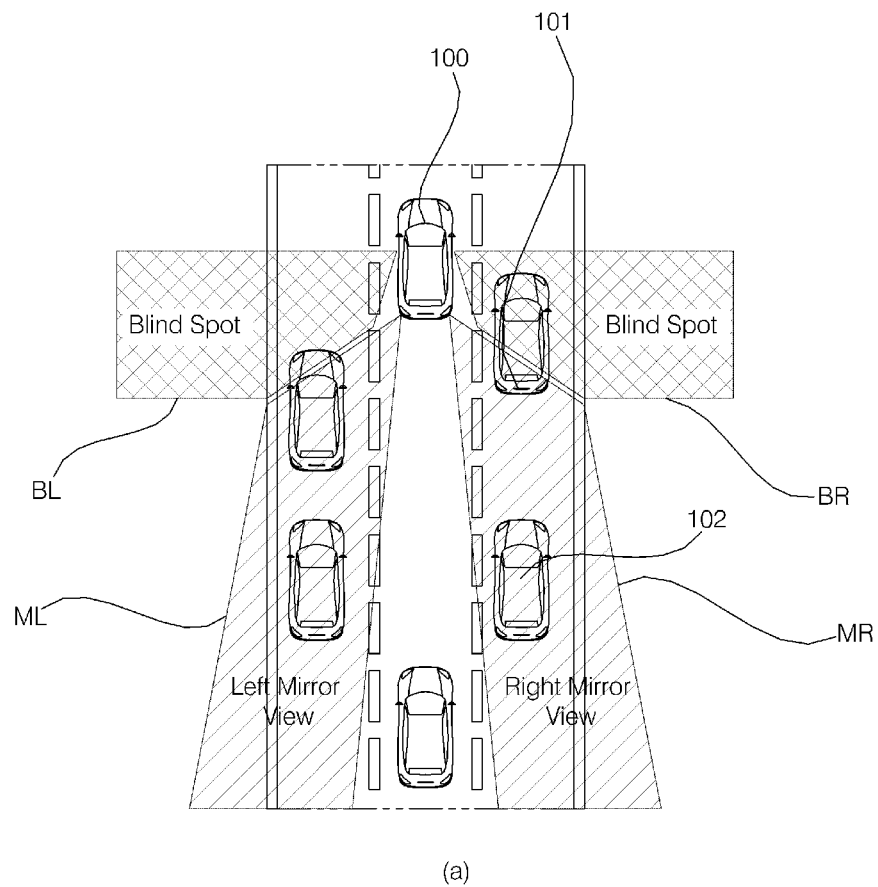
FIG. 13 is a view showing an example auxiliary image output operation of the side mirror for a vehicle.
Figure 13:
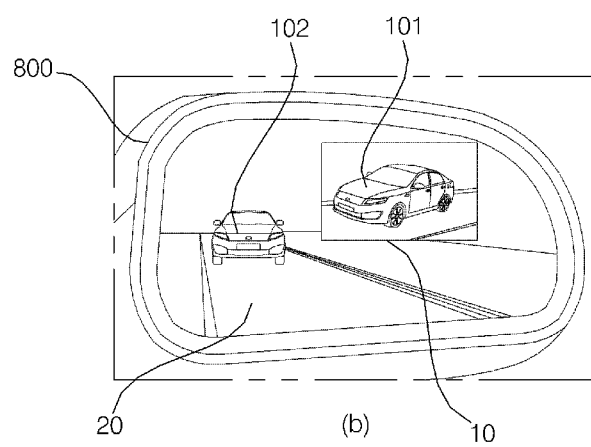

FIG. 13 is a view for explaining the auxiliary image output operation of the side mirror 800 for a vehicle.

Referring to (a) in FIG. 13, areas MR and ML, which are visible to a driver through the mirror panel 860, and BSD areas BR and BL are present around the vehicle 100.

The processor 870 may determine the location of another vehicle present around the vehicle 100 based on ambient situation information, which is included in vehicle traveling information.

The processor 870 may determine whether another vehicle 101 is located in the BSD areas based on ambient situation information. The other vehicle 101 present in the BSD areas is a potentially dangerous object.

Upon determining that the other vehicle 101 is present in the BSD areas, the processor 870 may determine that the first event occurs.

Referring to (b) in FIG. 13, upon determining that the first event occurs, for example, that the other vehicle 101 is present in the BSD areas, the processor 870 may output an auxiliary image 10 on a portion of the display panel 850.

The auxiliary image 10 may be a captured image in which a potentially dangerous object appears. In the implementation illustrated in the drawing, the auxiliary image 10 is a captured image in which the other vehicle 101 located in the BSD areas appears.

Upon determining that the other vehicle 101 is present in the BSD areas, the processor 870 may capture an image of the other vehicle 101 through the camera 810. In this case, the processor 870 may capture an enlarged image of the other vehicle 101 located in the BSD areas.

The auxiliary image 10 in which the other vehicle 101 located in the BSD areas appears is output on a mirror area. The mirror area is an area of the side mirror 800, in which a mirror image appears.

The processor 870 may output the auxiliary image 10, in which the other vehicle 101 located in the BSD areas appears, on a secondary area within the mirror area.

The driver of the vehicle 100 may monitor the other vehicle 101 appearing in the auxiliary image 10 as well as a further vehicle 102 whose image is reflected in the mirror panel 860.

Figure 14:
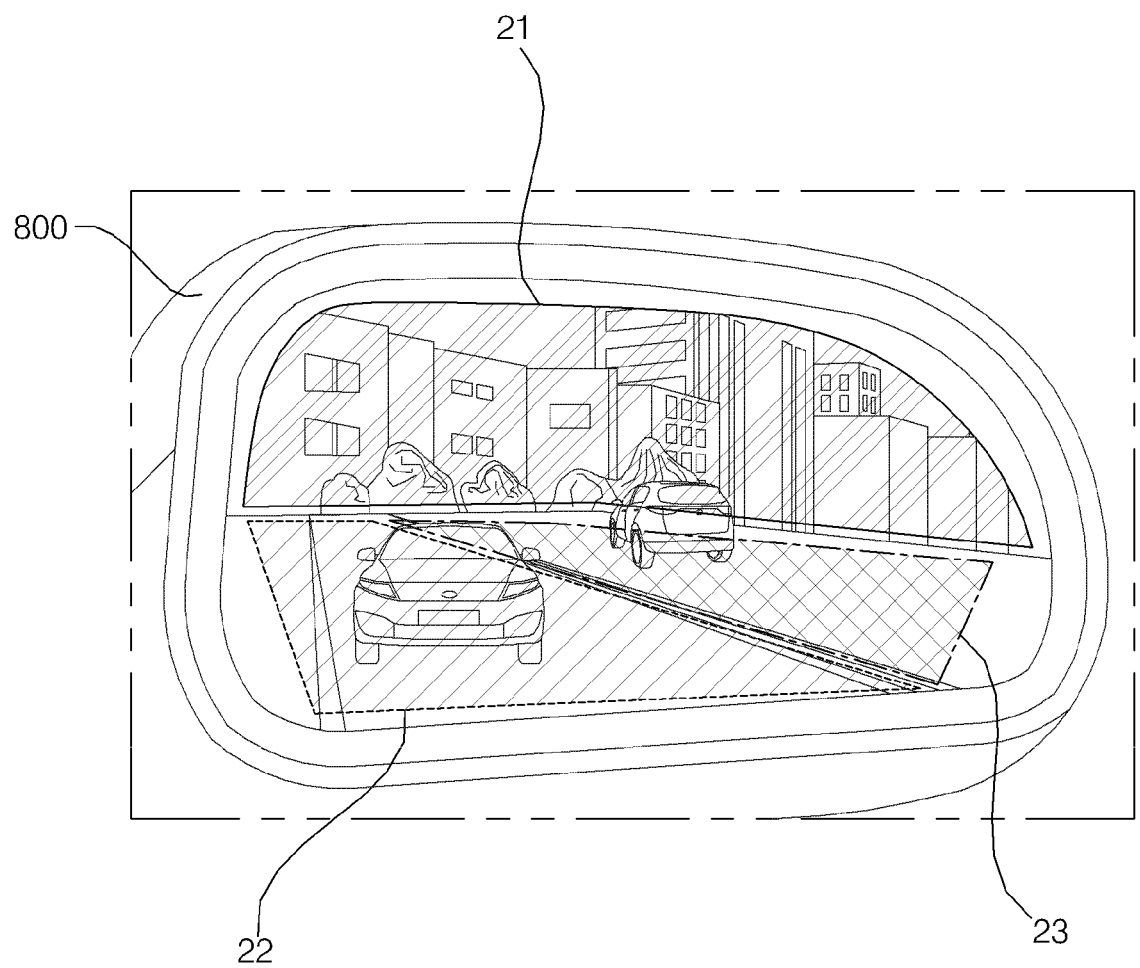
FIG. 14 is a view showing an example secondary area on which an auxiliary image may be output.

FIG. 14 is a view for explaining a secondary area on which an auxiliary image is output.

The processor 870 may determine a secondary area to be an output position of an auxiliary image. In some cases, the secondary area may include an area that a driver may consider unnecessary or unimportant.

The secondary area is an area that a driver does not need to check in a mirror image reflected in the mirror panel 860 or a side-rear image displayed on the display panel 850.

For example, the secondary area may include areas 21 and 23, excluding a road on which the vehicle 100 is traveling, in a mirror image or a side-rear image. The road on which the vehicle 100 is traveling may include a traveling lane, on which the vehicle 100 is traveling, and a lane formed next to the traveling lane and extending in the same direction as the traveling lane.

The processor 870 may determine an area 22, in which the traveling road of the vehicle 100 appears, within a mirror image or a side-rear image. The processor 870 may determine areas 21 and 23 in a mirror image or a side-rear image, excluding the area 22 in which the traveling road of the vehicle 100 appears, to be a secondary area.

For example, the secondary area may be an area 23 in which a lane for an oncoming vehicle is present in a mirror image or a side-rear image. The secondary area may be an area 21 in which at least one of a tree, a building, or the sky is present in a mirror image or a side-rear image.

In the mirror mode, the processor 870 may determine secondary areas 21 and 23 in a mirror image based on the mirror image reflected in the mirror panel 860 and ambient situation information. For example, the processor 870 may determine areas 21 and 23 in a mirror image, in which an oncoming lane, a tree, a building, or the sky is present, to be secondary areas based on the mirror image and ambient situation information.

In the mirror mode, the processor 870 may output an auxiliary image on a portion of the secondary areas 21 and 23 in a mirror image.

In the display mode, the processor 870 may determine secondary areas 21 and 23 in a side-rear image based on the side-rear image displayed on the display panel 850 and ambient situation information. For example, the processor 870 may determine areas 21 and 23 in a side-rear image, in which an oncoming lane, a tree, a building, or the sky is present, to be secondary areas based on the side-rear image and ambient situation information.

In the display mode, the processor 870 may output an auxiliary image on a portion of the secondary areas 21 and 23 in a side-rear image.

According to the side mirror 800 of the present disclosure, the auxiliary image 10 is output on the secondary areas 21 and 23, thereby preventing the auxiliary image 10 from blocking an area that a driver needs to perceive.

Figure 15:
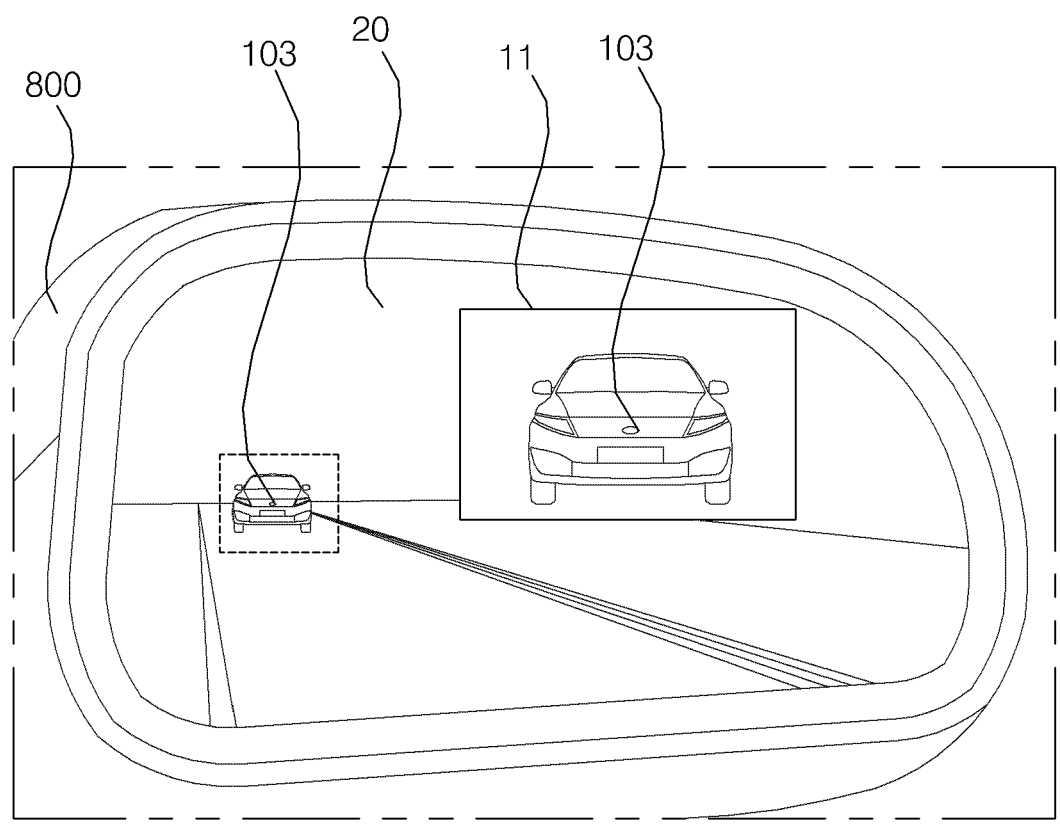
FIG. 15 is a view showing an example enlarged image output operation of the side mirror for a vehicle.

FIG. 15 is a view for explaining the enlarged image output operation of the side mirror 800 for a vehicle.

If the size of a potentially dangerous object 103 appearing in a mirror image or a side-rear image is equal to or less than a predetermined size, the processor 870 may output a captured enlarged image 11 of the potentially dangerous object 103 on a portion of the display panel 850.

In this case, the captured enlarged image 11 of the potentially dangerous object 103 (hereinafter referred to as an 'enlarged image') is an auxiliary image.

The predetermined size is a reference value that is predetermined in order to determine whether to output the enlarged image 11. The predetermined size may be a value derived through experimentation.

The processor 870 may capture an enlarged image of the potentially dangerous object 103 through the camera 810.

The processor 870 may output the enlarged image 11 on the secondary area in a mirror image or a side-rear image.

If the size of the potentially dangerous object 103 appearing in a mirror image or a side-rear image is equal to or less than a predetermined size, it will be difficult for a driver to perceive the potentially dangerous object 103. In order to eliminate this problem, the side mirror 800 according to the present disclosure may output the enlarged image 11, whereby a driver may easily perceive the potentially dangerous object 103.

Figure 16:
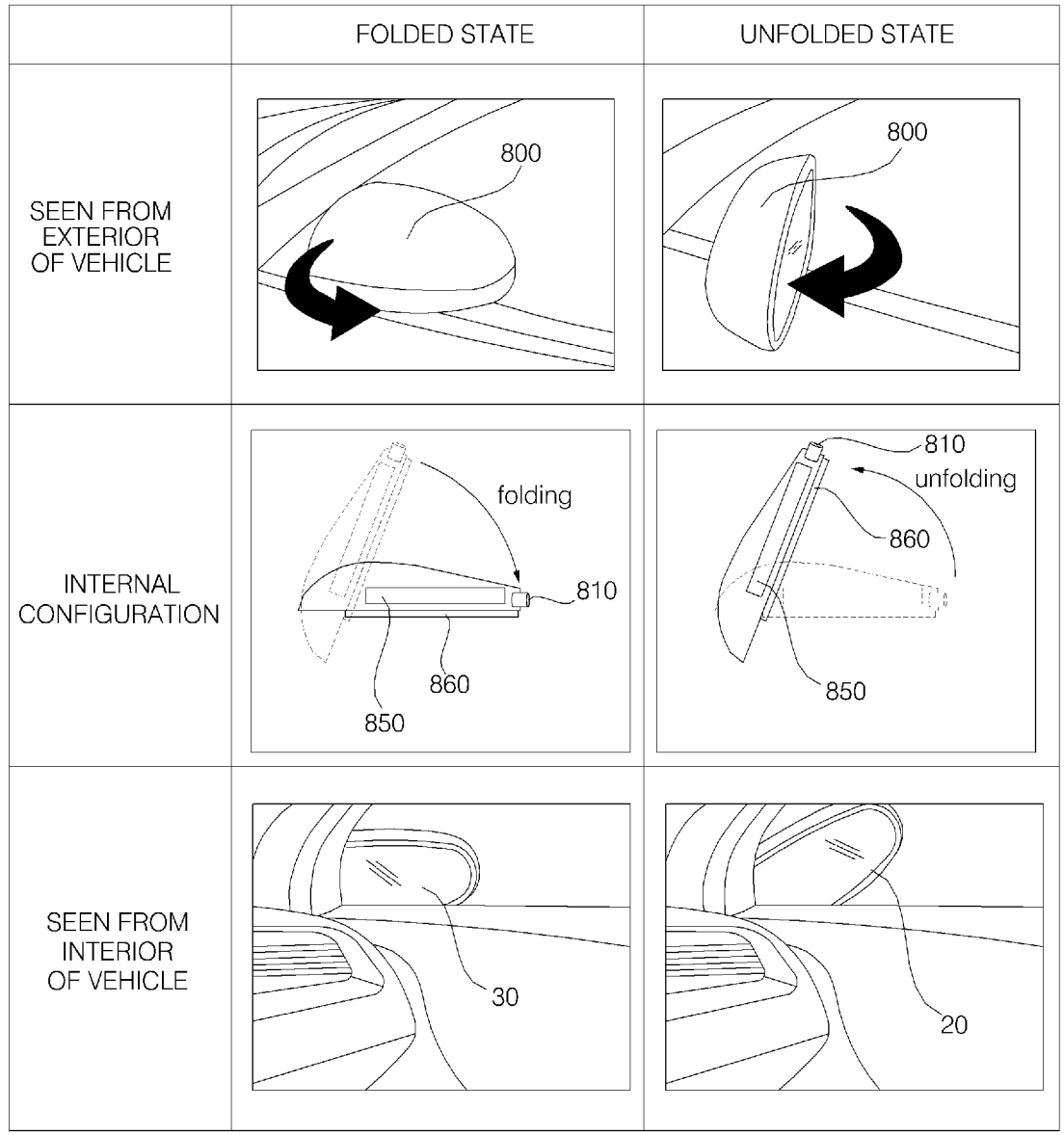
FIG. 16 is a view showing an example folding mode and an example unfolding mode of the side mirror for a vehicle.

FIG. 16 is a view for explaining the folding mode and the unfolding mode of the side mirror 800 for a vehicle.

The processor 870 may control the folding driver 880 by providing a control signal thereto.

The processor 870 may fold or unfold the side mirror 800 by controlling the folding driver 880.

The processor 870 may control the folding driver 880 so that the side mirror 800 is folded or unfolded based on user input.

The processor 870 may acquire user input, which is input to the user interface device 200, through the interface 830. If the acquired user input is a command to fold the side mirror 800, the processor 870 may control the folding driver 880 so that the side mirror 800 is folded. If the acquired user input is a command to unfold the side mirror 800, the processor 870 may control the folding driver 880 so that the side mirror 800 is unfolded.

The processor 870 may control the folding driver 880 so that the side mirror 800 may be folded or unfolded based on vehicle traveling information.

Upon determining that a predetermined second event occurs based on vehicle traveling information, the processor 870 may fold the side mirror 800.

For example, the second event may include the situation in which the number of other vehicles present in a side rear area of the vehicle 100 is equal to or greater than a predetermined value, the situation in which it is determined that the unfolded side mirror 800 will collide with an object, and the situation in which it is determined that the fuel efficiency of the vehicle 100 needs to be improved.

When the side mirror 800 is folded, the processor 870 outputs a side-rear image on the display panel 850. Accordingly, an image area 30 is formed in the side mirror 800. The image area 30 is an area in which an image appears. When the side mirror 800 is unfolded, the processor 870 may turn off the display panel 850, so that a mirror area 20 is formed in the mirror panel 860.

Unlike the configuration illustrated in the drawing, even when the side mirror 800 is in the unfolded state, the processor 870 may output a side-rear image on the display panel 850. Upon determining that a user selects the display mode in the unfolded state of the side mirror 800 based on the acquired user input, the processor 870 may output a side-rear image on the display panel 850 even when the side mirror 800 is in the unfolded state. In this case, even when the side mirror 800 is in the unfolded state, the image area 30 may be formed in the side mirror 800.

Figure 17:
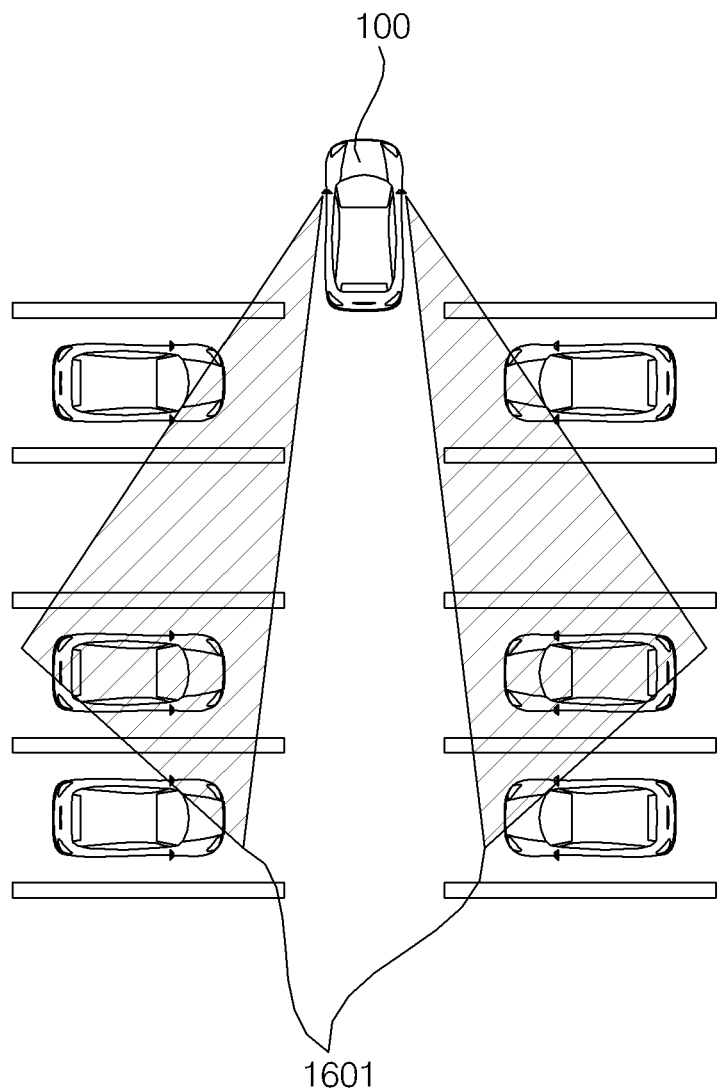
FIGS. 17 and 18 are views showing example operations of the side mirror when a vehicle is being parked while the side mirror is in a folded state.
Figure 18:
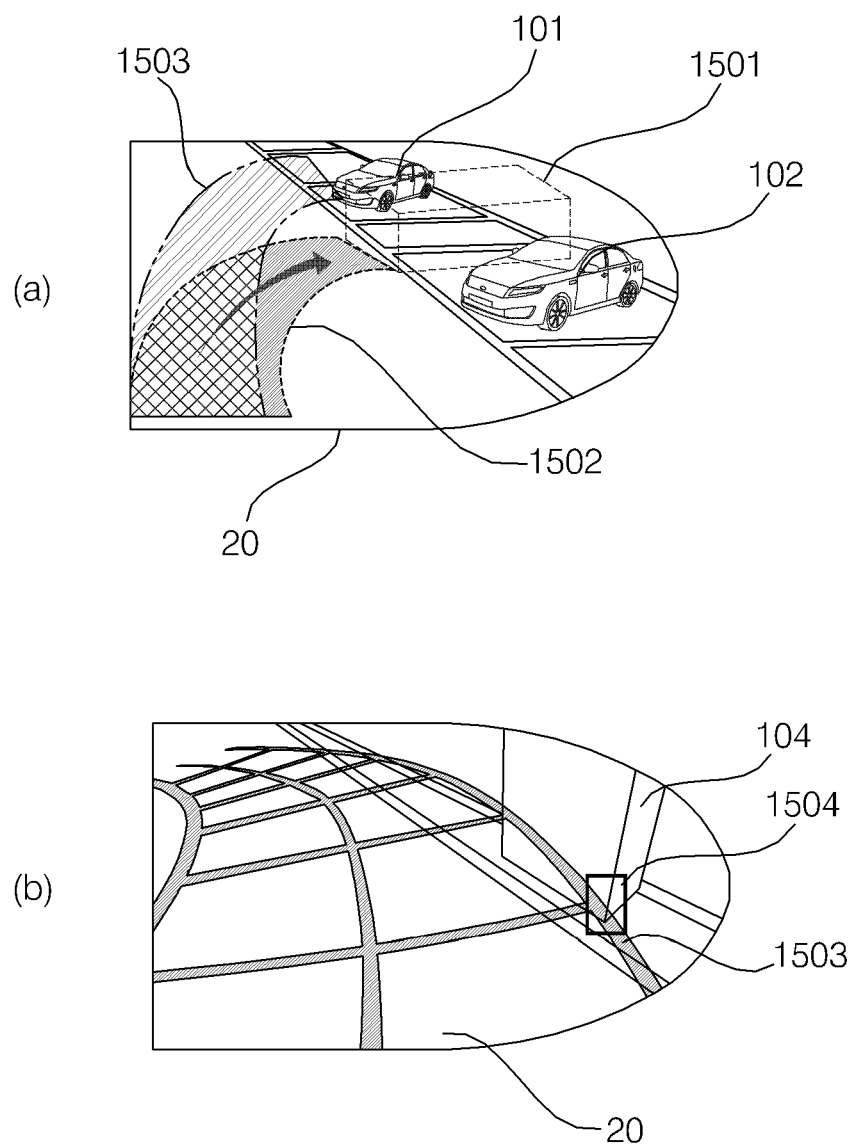

FIGS. 17 and 18 are views for explaining the operation of the side mirror 800 when the vehicle is being parked while the side mirror is in the folded state.

Referring to FIG. 17, when the vehicle 100 is being parked while the side mirror 800 is in the folded state, the processor 870 may output a side-rear image on the display panel 850.

The processor 870 may determine whether the vehicle 100 is being parked based on vehicle traveling information. For example, upon determining that the vehicle 100 has arrived at a predetermined destination based on vehicle traveling information, the processor 870 may determine that the vehicle 100 will be parked. For example, upon determining that the automatic parking function of the vehicle 100 is in an activated state based on vehicle traveling information, the processor 870 may determine that the vehicle 100 is being parked. For example, upon determining that the vehicle 100 is traveling at a speed lower than a predetermined speed around a parking space based on vehicle traveling information, the processor 870 may determine that the vehicle 100 is being parked.

Referring to FIG. 18, the processor 870 may display at least one of an available space, a set guidance path, a predicted path on the basis of a steering angle of the steering wheel, or a predicted collision point on the basis of the predicted path on a side-rear image in the AR manner.

Referring to (a) in FIG. 18, the processor 870 may superimpose an image 1501, which indicates an available space, on a side-rear image.

The processor 870 may display images such that the image 1501 indicating an available space is superimposed on the actual available space that appears in the side-rear image.

If an available space is selected based on user input or if there is an available space that is determined to be a parking space in which the vehicle may most easily be parked based on vehicle traveling information, the processor 870 may set a guidance path, for example, a path along which the vehicle 100 enters the available space.

The processor 870 may superimpose an image 1502, which indicates a set guidance path, on a side-rear image.

The processor 870 may display images such that the image 1502 indicating a set guidance path is superimposed on the actual guidance path that appears in the side-rear image. The processor 870 may determine a predicted path based on the steering angle of the steering wheel of the vehicle 100. The steering wheel is a kind of steering input device 510.

The processor 870 may superimpose an image 1503, which indicates a predicted path of the vehicle 100, on a side-rear image.

The processor 870 may display images such that the image 1503 indicating a predicted path of the vehicle 100 is superimposed on the actual predicted path that appears in the side-rear image.

Referring to (b) in FIG. 18, the processor 870 may display an image 1504, which indicates a predicted collision point, on a side-rear image.

Based on the location and shape of an object 104, which are determined on the basis of ambient situation information, and a predicted path, which is determined on the basis of a steering angle of the steering wheel of the vehicle 100, the processor 870 may determine a predicted collision point at which the vehicle 100 and the object 104 are predicted to collide with each other.

The processor 870 may display the image 1503, indicating a predicted path of the vehicle 100, and the image 1504, indicating a predicted collision point, on a side-rear image.

The processor 870 may display the image 1504 indicating a predicted collision point on an area that corresponds to the actual location of the object 104 that is determined to collide with the vehicle 100.

Figure 19:
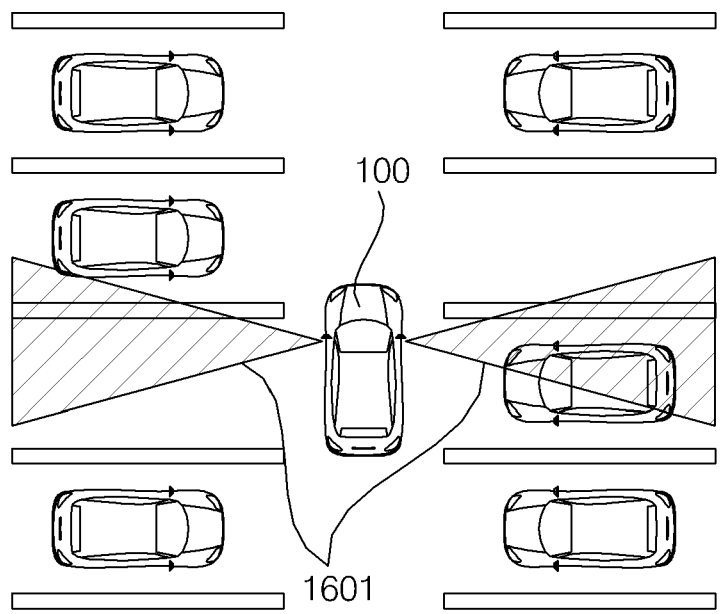
FIG. 19 is a view showing an example operation of the side mirror when a vehicle is being parked while the side mirror is in an unfolded state.

FIG. 19 is a view for explaining the operation of the side mirror 800 when the vehicle is being parked while the side mirror is in the unfolded state.

When the vehicle 100 is being parked while the side mirror 800 is in the unfolded state, the processor 870 may detect a parking space that is present beside the vehicle 100 based on a side-rear image.

If the side mirror 800 is unfolded, the camera 810 disposed at the side mirror 800 is oriented toward a side area of the vehicle 100, and thus may capture an image of a wider area. Therefore, in the unfolded state, the side mirror 800 according to the present disclosure detects a parking space present beside the vehicle 100 based on the side-rear image, thereby detecting a greater number of parking spaces.

Figure 20:
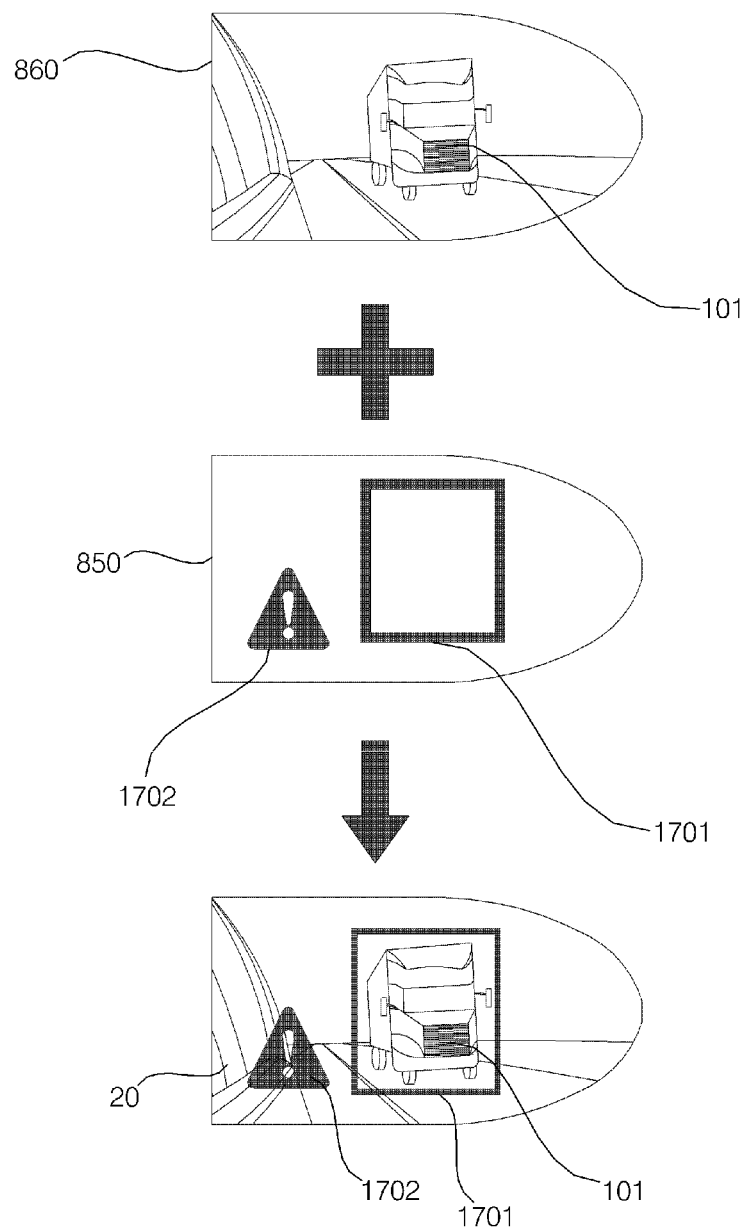
FIG. 20 is a view showing an example of adding an example variable image to a mirror image in the side mirror for a vehicle.

FIG. 20 is a view for explaining the addition of the variable image to the mirror image in the side mirror 800 for a vehicle.

In the mirror mode, the processor 870 may determine whether a potentially dangerous object is present in a mirror image based on vehicle traveling information.

For example, the processor 870 may determine another vehicle 101, which is traveling in a lane next to the traveling lane of the vehicle 100 and is approaching the vehicle 100, to be a potentially dangerous object based on ambient situation information.

In the mirror mode, if the potentially dangerous object 101 is reflected in the mirror panel 860, the processor 870 may output variable images 1701 and 1702 for highlighting the potentially dangerous object 101 on a portion of the display panel 850.

The variable image may be an image for highlighting a potentially dangerous object 101 reflected in the mirror panel 860.

For example, the variable image may be a highlight box 1701 surrounding a potentially dangerous object 101 or a warning image 1702 indicating the danger.

The processor 870 may output a highlight box 1701 on the display panel 850 so that the highlight box 1701 surrounds a potentially dangerous object 101 appearing in a mirror image.

The processor 870 may output a warning image 1702 on the display panel 850.

When the variable images 1701 and 1702 are displayed on the display panel 850, the variable images 1701 and 1702 overlap the mirror image reflected in the mirror panel 860, and therefore a user may view the mirror image overlapping the variable images 1701 and 1702.

The potentially dangerous object 101 is highlighted by the variable images 1701 and 1702 appearing in the mirror area 20, and therefore a user may easily perceive the potentially dangerous object 101 appearing in the mirror area 20.

Figure 21:
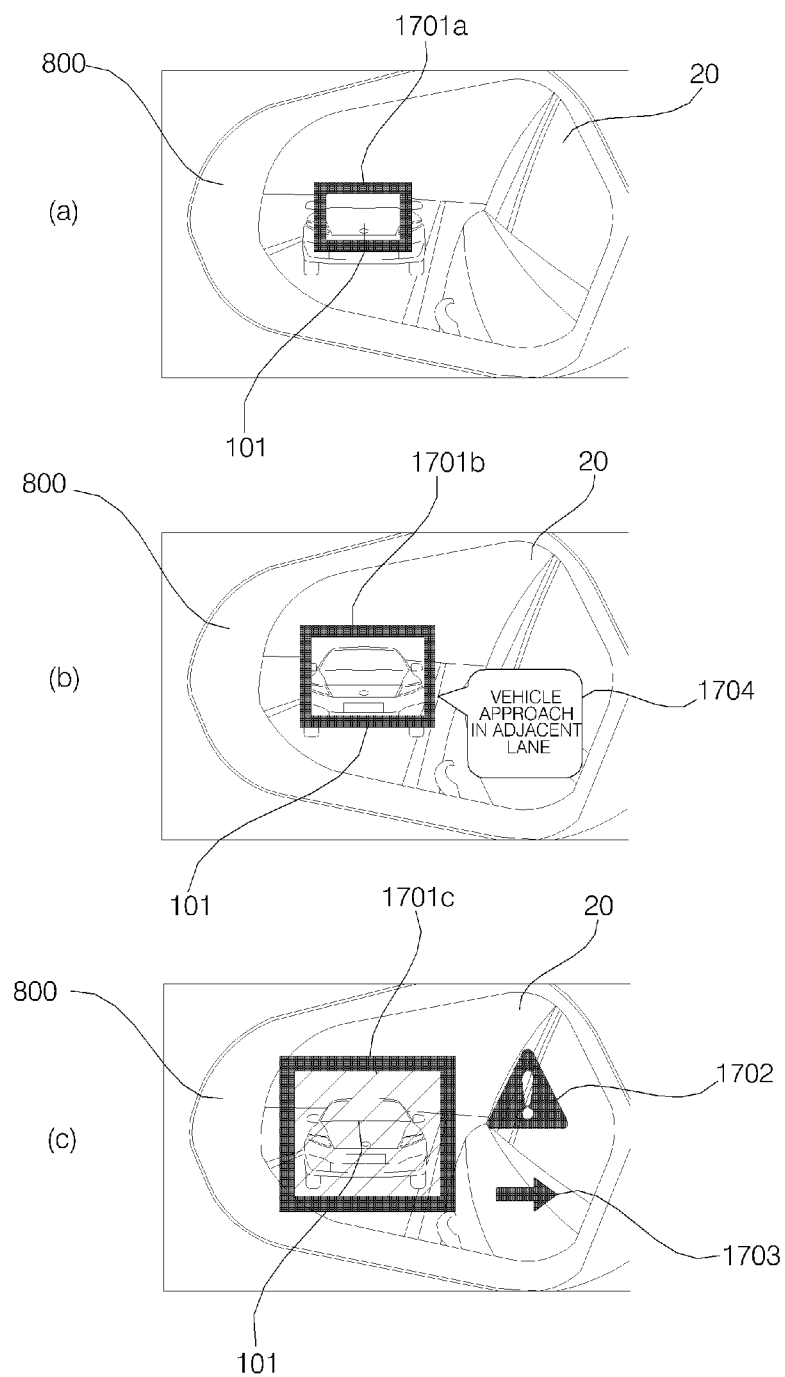
FIG. 21 is a view for showing an example change of the variable image based on a state of an object in the side mirror for a vehicle.

FIG. 21 is a view for explaining a change in the variable image based on the state of an object in the side mirror 800 for a vehicle.

The processor 870 may change a variable image or a visual effect based on potentially dangerous object information.

The potentially dangerous object information may be information about at least one of a type, a speed, a location, a shape, a color, or a size of the potentially dangerous object, or the possibility of a collision thereof with the vehicle 100.

Changing the variable image may include changing at least one of a location, size, shape, color, or type of the variable image.

Changing the visual effect may include changing at least one of a location, size, shape, color, or type of an image that is added by the provision of a visual effect (hereinafter referred to as a 'visual effect image').

In FIG. 21, (a) shows the situation in which the distance between the vehicle 100 and the other vehicle 101 traveling in the lane next to the traveling lane of the vehicle 100 is relatively long and in which the possibility of a collision between the vehicle 100 and the other vehicle 101 is relatively low. In FIG. 21, (b) shows the situation in which the distance between the vehicle 100 and the other vehicle 101 traveling in the lane next to the traveling lane of the vehicle 100 becomes shorter than that in (a) in FIG. 21 and in which the possibility of a collision between the vehicle 100 and the other vehicle 101 becomes higher than that in (a) in FIG. 21. In FIG. 21, (c) shows the situation in which the distance between the vehicle 100 and the other vehicle 101 traveling in the lane next to the traveling lane of the vehicle 100 becomes shorter than that in (b) in FIG. 21 and in which the possibility of a collision between the vehicle 100 and the other vehicle 101 becomes higher than that in (b) in FIG. 21.

Regarding (a) in FIG. 21, the processor 870 may determine the other vehicle 101, which is traveling in the lane next to the traveling lane of the vehicle 100, to be a potentially dangerous object.

If the possibility of a collision between the vehicle 100 and the other vehicle 101 traveling in the lane next to the traveling lane of the vehicle 100 is equal to or less than a first stage value, the processor 870 may determine the variable image to be a green highlight box 1701*a*.

In order to highlight the other vehicle 101, which is determined to be a potentially dangerous object, the processor 870 may output the green highlight box 1701*a* on the display panel 850 so as to surround the other vehicle 101.

Referring to (b) in FIG. 21, based on ambient situation information, upon determining that the possibility of a collision between the vehicle 100 and the other vehicle 101 traveling in the lane next to the traveling lane of the vehicle 100 is greater than the first stage value and equal to or less than a second stage value, the processor 870 may change the variable image into a yellow highlight box 1701*b*, which is bigger than the green highlight box 1701*a*.

In addition, upon determining that the possibility of a collision between the vehicle 100 and the other vehicle 101 is greater than the first stage value and equal to or less than the second stage value, the processor 870 may additionally output an image 1704, which may include a message indicating the approach of the other vehicle 101, on the display panel 850.

Referring to (c) in FIG. 21, based on ambient situation information, upon determining that the possibility of a collision between the vehicle 100 and the other vehicle 101 traveling in the lane next to the traveling lane of the vehicle 100 is greater than the second stage value, the processor 870 may change the variable image into a red highlight box 1701*c*, which is bigger than the yellow highlight box 1701*b*.

Upon determining that the possibility of a collision between the vehicle 100 and the other vehicle 101 is greater than the second stage value, the processor 870 may additionally output a warning image 1702, indicating the danger, and an image 1703, indicating the direction in which the vehicle 100 needs to travel in order to avoid the other vehicle 101, on the display panel 850.

Figure 22:
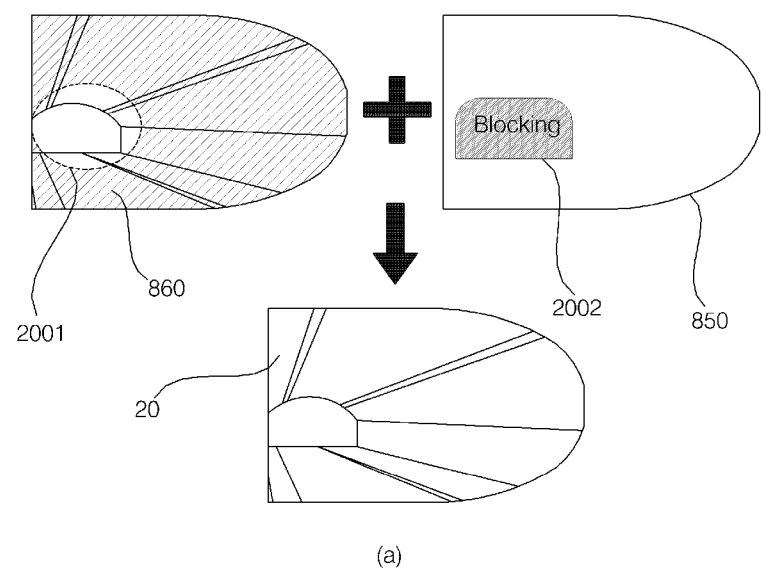
FIG. 22 is a view showing an example operation of darkening an example glare area in the side mirror for a vehicle.
Figure 22:
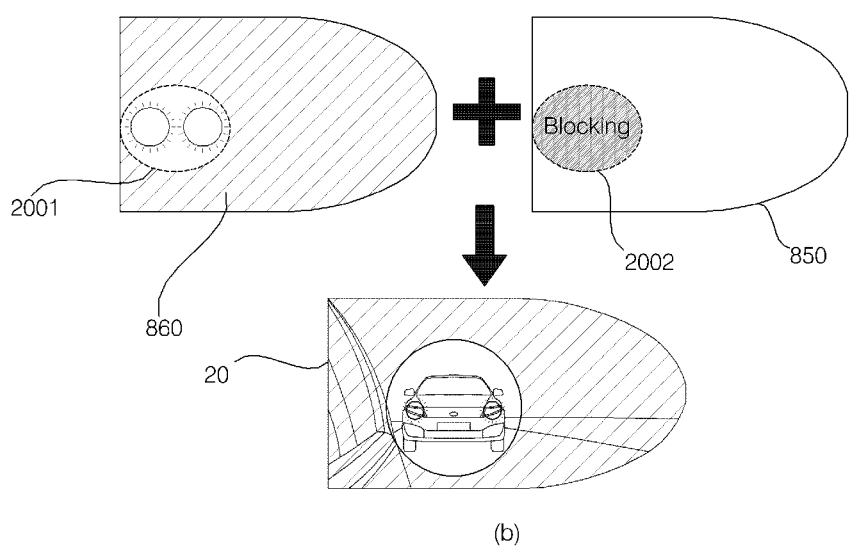

FIG. 22 illustrates an example operation of darkening a glare area in the side mirror 800 for a vehicle.

If a glare area 2001 appears in the mirror panel 860, the processor 870 may output a variable image 2002, darkening the glare area 2001 appearing in a mirror image or a side-rear image, on a portion of the display panel 850.

The glare area 2001 is an area in a mirror image or a side-rear image, the brightness of which is equal to or higher than a predetermined reference brightness. The reference brightness is a reference value for determining whether a user suffers from glare, and is determined through experimentation. Data relevant to the reference brightness may be stored in the memory 820.

The processor 870 may determine the brightness distribution of a mirror image or a side-rear image based on the image data acquired through the camera 810. The processor 870 may determine the area 2001, the brightness of which is equal to or higher than the reference brightness, to be a glare area based on the brightness distribution in a mirror image or a side-rear image.

In (a) in FIG. 22, an area in a mirror image or a side-rear image, in which an exit of a tunnel is present, may be the glare area 2001 having a brightness equal to or higher than the reference brightness.

In (b) in FIG. 22, an area in a mirror image or a side-rear image, in which a lamp of another vehicle that is emitting light is present, may be the glare area 2001 having a brightness equal to or higher than the reference brightness.

The processor 870 may determine the area 2001, the brightness of which is equal to or higher than the reference brightness, to be a glare area based on the brightness distribution in a mirror image or a side-rear image.

The processor 870 may output a variable image 2002 for blocking the glare area 2001 on a portion of the display panel 850 that corresponds to the position of the glare area 2001 in the mirror panel 860.

If the variable image 2002 for darkening the glare area 2001 is output on a portion of the display panel 850, the glare area 2001 appearing in the mirror panel 860 and the variable image 2002 output on the display panel 850 overlap each other, thereby decreasing the brightness of the glare area appearing in the mirror area 20. Therefore, a driver of the vehicle 100 may clearly view an image appearing in the mirror area 20 or the image area 30 even when an object causing glare appears in a mirror image or a side-rear image.

Figure 23:
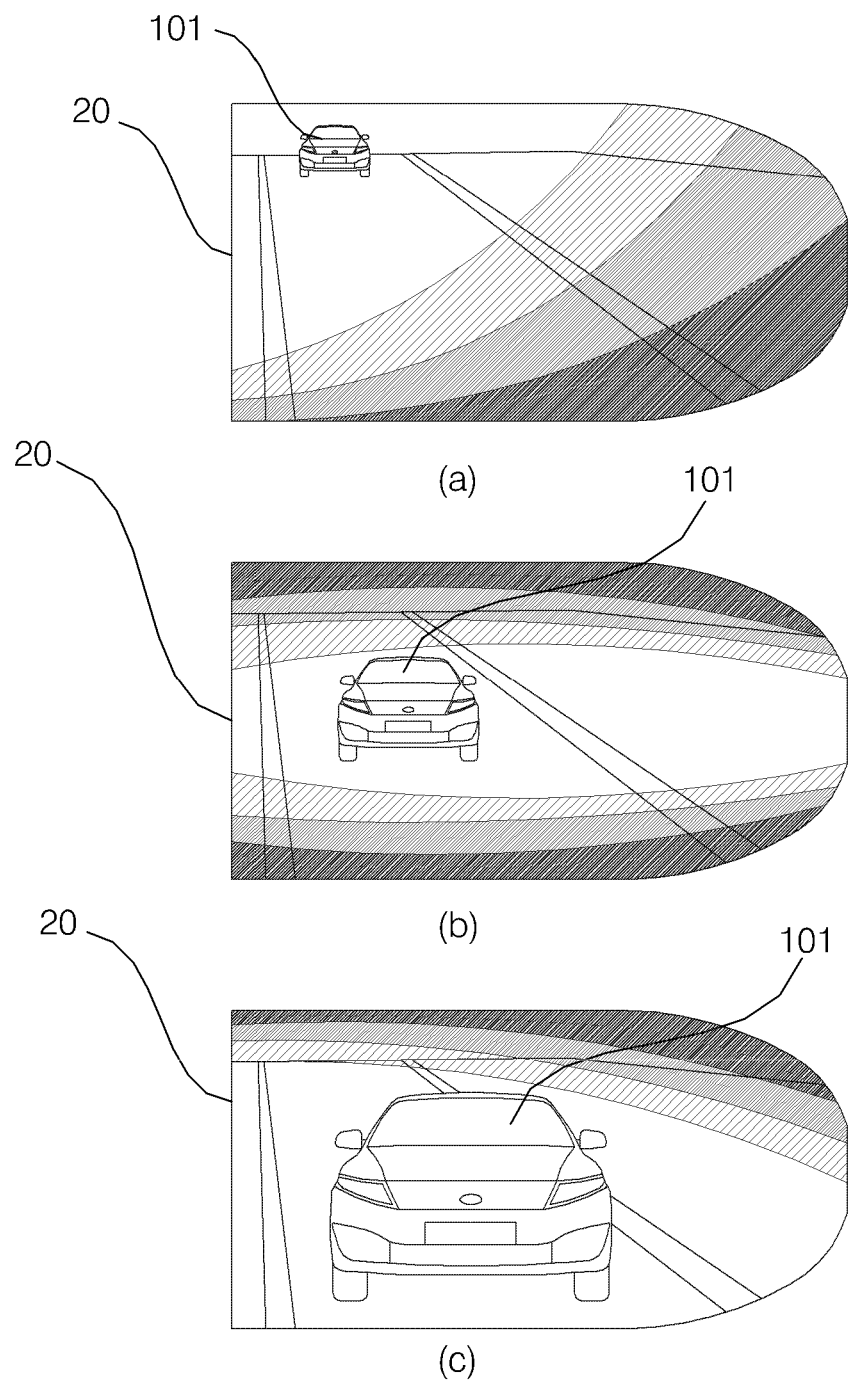
FIG. 23 is a view showing an example operation of highlighting a potentially dangerous object in the side mirror for a vehicle.

FIG. 23 illustrates an example operation of highlighting a potentially dangerous object in the side mirror 800 for a vehicle.

In the mirror mode, the processor 870 may output a gradation display, in which an area around a potentially dangerous object is displayed with a bright color and the remaining area is displayed with a dark color, on the display panel 850, as the variable image for highlighting the potentially dangerous object.

In the display mode, the processor 870 may provide a gradation effect, in which an area around a potentially dangerous object is displayed with a bright color and the remaining area is displayed with a dark color, to a side-rear image, as the visual effect highlighting the potentially dangerous object.

In FIG. 23, (a) to (c) show the situation in which another vehicle 101, which is determined to be a potentially dangerous object, is gradually approaching the vehicle 100. In the mirror mode, the processor 870 may change the gradation display in accordance with a change in the location of the other vehicle 101.

The processor 870 may change the gradation display such that an area around the other vehicle 101, which is moving, is displayed with a bright color and the remaining area is displayed with a dark color.

In the display mode, the processor 870 may change the gradation effect in accordance with a change in the location of the other vehicle 101.

The processor 870 may change the gradation effect such that an area around the other vehicle 101, which is moving, is displayed with a bright color and the remaining area is displayed with a dark color.

As such, since an area around the other vehicle 101 is displayed with a bright color and the remaining area is displayed with a dark color, a user may easily perceive the other vehicle 101.

Figure 24:
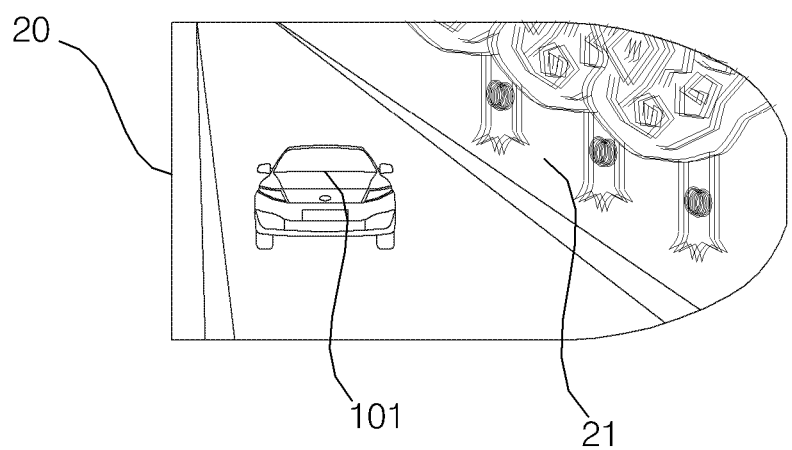
FIG. 24 is a view showing an example operation of blurring or darkening an example secondary area in the side mirror for a vehicle.
Figure 24:
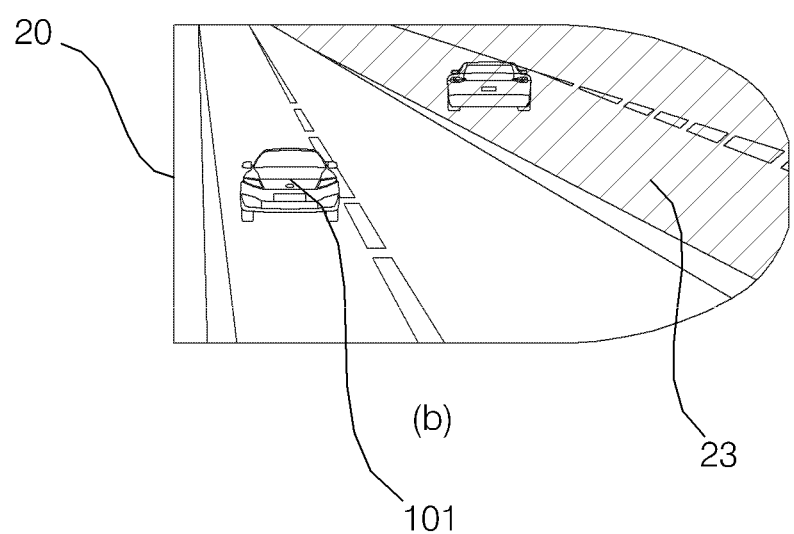

FIG. 24 illustrates an example operation of blurring or darkening a secondary area in the side mirror 800 for a vehicle.

Referring to (a) in FIG. 24, in the mirror mode, the processor 870 may output a variable image, which blurs a secondary area 21 in a mirror image, on a portion of the display panel 850. In this case, if the secondary area 21 in the mirror image and the variable image output on the display panel 850 overlap each other, the secondary area may appear blurred.

In addition, in the display mode, the processor 870 may provide a visual effect blurring the secondary area 21 in a side-rear image. In this case, the secondary area 21 in the side-rear image may appear blurred.

The processor 870 may determine an area 21, in which it is determined that an object such as a tree is present based on ambient situation information, to be a secondary area.

The side mirror 800 according to the present disclosure enables a user to pay attention to an area, excluding a secondary area, by blurring the secondary area in a mirror image or a side-rear image.

Referring to (b) in FIG. 24, in the mirror mode, the processor 870 may output a variable image, which darkens a secondary area 22 in a mirror image, on a portion of the display panel 850. In this case, if the secondary area 22 in the mirror image and the variable image output on the display panel 850 overlap each other, the secondary area may appear dark.

In addition, in the display mode, the processor 870 may provide a visual effect darkening the secondary area 22 in a side-rear image. In this case, the secondary area 22 in the side-rear image may appear dark.

The processor 870 may determine an area 22 that is determined to be a lane for oncoming vehicles based on ambient situation information to be a secondary area.

The side mirror 800 according to the present disclosure enables a user to pay attention to an area, excluding a secondary area, by darkening the secondary area in a mirror image or a side-rear image.

As is apparent from the above description, implementations of the present disclosure have one or more effects.

First, since a driver is capable of perceiving, in a display mode, an object that cannot be seen in a mirror mode, safety may be improved.

Secondly, even when a camera cannot normally capture an image or a display device cannot normally display an image due to a malfunction thereof or the like, safety may be ensured by utilizing a mirror mode.

Thirdly, since a vehicle is able to travel with a side mirror folded, drag attributable to the side mirror may be reduced, and consequently fuel efficiency may be improved.

Fourthly, a variable image is additionally displayed on a mirror image, thereby enabling a user to easily perceive a potentially dangerous situation and consequently ensuring safety.

The present disclosure may be implemented as code that can be written on a computer-readable recording medium and thus read by a computer system. The computer-readable recording medium may be any type of recording device in which data is stored in a computer-readable manner. Examples of the computer-readable recording medium include a Hard Disk Drive (HDD), a Solid State Disk (SSD), a Silicon Disk Drive (SDD), a Read Only Memory (ROM), a Random Access Memory (RAM), a Compact Disk ROM (CD-ROM), a magnetic tape, a floppy disc, an optical data storage, and a carrier wave (e.g., data transmission over the Internet). The computer may include a processor or a controller. The above implementations are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

What is claimed is:

1. A side mirror for a vehicle, comprising:
a camera;
a mirror panel disposed at a portion of the side mirror;
a display panel stacked on the mirror panel; and
at least one processor configured to:
cause the side mirror to enter one of a mirror mode or a display mode based on vehicle traveling information,
based on the side mirror being in the mirror mode, output, on a portion of the display panel, a visualization on a mirror image that appears in the mirror panel,
based on the side mirror being in the display mode, output, on the display panel in the display mode, a side-rear image captured by the camera, and
based on the side mirror being in the display mode, provide, a visual effect to a portion of the side-rear image regarding ambient situation information,
wherein the at least one processor is configured to cause the side mirror to enter the display mode based on a determination that a number of other vehicles located in a side rear area of the vehicle is greater than or equal a predetermined value,
wherein the at least one processor is configured to:
determine an occurrence of a first event by determining whether an object is located in a side rear area of the vehicle based on the ambient situation information,
acquire an image of the object through the camera based on a determination that the object is located in the side rear area of the vehicle, and
output the image of the object on a portion of the display panel based on a determination of the occurrence of the first event, wherein the at least one processor is further configured to:
based on the side mirror being in the mirror mode, identify a secondary area in the mirror image and output the image of the object on a portion of the secondary area in the mirror image, and based on the side mirror being in the display mode, identify a secondary area in the side-rear image and output the image of the object on a portion of the secondary area in the side-rear image, wherein the secondary area in the mirror image or the secondary area in the side-rear image corresponds to an area outside a road including a traveling lane on which the vehicle is traveling and a lane that is disposed adjacent to the traveling lane and that extends along the traveling lane, and wherein the at least one processor is further configured to:
control a folding device to fold or unfold the side mirror based on the vehicle traveling information,
determine whether the vehicle is being parked based on vehicle traveling information, and
output, based on the vehicle being parked in a state in which the side mirror is folded, the side-rear image in an augmented reality manner to indicate at least one of an available space, a set guidance path, a predicted path determined based on a steering angle of a steering wheel of the vehicle, or a predicted collision point determined based on the predicted path.

2. The side mirror according to claim 1, wherein the at least one processor is further configured to:
determine whether the camera is able to capture an adequate image based on the vehicle traveling information; and
cause the side mirror to enter the mirror mode based on a determination that the camera is not able to capture the adequate image.

3. The side mirror according to claim 2, wherein the at least one processor is further configured to determine whether the camera is not able to capture the adequate image based on determining whether the camera is faulty or the side-rear image includes an error.

4. The side mirror according to claim 3, wherein:
determining whether the camera is faulty is based on vehicle state information, and
determining whether the side-rear image includes an error is based on the ambient situation information.

5. The side mirror according to claim 1, wherein the mirror panel and the display panel comprise bendable panels,
and
wherein, based on the side mirror being in the mirror mode, the at least one processor is further configured to:
determine whether a second vehicle is present in a blind spot detection (BSD) area of the vehicle based on the ambient situation information, and
control a bending device to bend the bendable panels to thereby include the BSD area in the mirror image.

6. The side mirror according to claim 5, wherein the at least one processor is further configured to cause the side mirror to enter the display mode based on a determination that the side mirror is in a folded state or that a number of other vehicles located in the BSD area is greater than or equal to a predetermined value.

7. The side mirror according to claim 1, wherein the at least one processor is further configured to cause the side mirror to enter one of the mirror mode or the display mode based on a user input.

8. The side mirror according to claim 1, wherein the at least one processor is further configured to:
determine whether a size of the object displayed in one of the mirror image or the side-rear image is less than or equal to a predetermined size; and
output an enlarged image of the object on a portion of the display panel based on a determination that the size of the object displayed in one of the mirror image or the side-rear image is less than or equal to the predetermined size.

9. The side mirror according to claim 1, wherein the at least one processor is further configured to:
determine whether an air drag attribute of the side mirror should be reduced based on the vehicle traveling information; and
control the folding device to fold the side mirror based on a determination that the air drag attribute of the side mirror should be reduced.

10. The side mirror according to claim 1, wherein the at least one processor is further configured to:
determine whether the camera is not able to capture an image based on the vehicle traveling information;
control the folding device to unfold the side mirror based on determination that the camera is not able to capture an image; and
cause the side mirror to enter the mirror mode based on a determination that the camera is not able to capture an image.

11. The side mirror according to claim 1, wherein the at least one processor is further configured to, based on the vehicle being parked in a state in which the side mirror is unfolded, identify a parking space around the vehicle based on the side-rear image captured by the camera.

12. The side mirror according to claim 1, wherein the at least one processor is further configured to:
output, based on a potentially dangerous object appearing in the mirror image in the mirror mode, the visualization to highlight the potentially dangerous object on a portion of the display panel; and
provide, based on a potentially dangerous object appearing in the side-rear image captured by the camera in the display mode, the visual effect to highlight the potentially dangerous object in the side-rear image.

13. The side mirror according to claim 12, wherein the at least one processor is further configured to change one of the visualization or the visual effect based on information about the potentially dangerous object.

14. The side mirror according to claim 1, wherein the at least one processor is further configured to:
based on the side mirror being in the mirror mode, output, on a portion of the display panel, the visualization to blur or darken the secondary area in the mirror image; and
based on the side mirror being in the display mode, provide the visual effect to blur or darken the secondary area in the side-rear image captured by camera.

15. The side mirror according to claim 1, wherein the at least one processor is further configured to:
based on the side mirror being in the mirror mode, output, on a portion of the display panel, the visualization to darken a glare area in the mirror image; and
based on the side mirror being in the display mode, provide the visual effect to darken a glare area in the side-rear image captured by the camera.

* * * * *